(12) United States Patent
Roysdon et al.

(10) Patent No.: US 12,743,607 B1
(45) Date of Patent: Sep. 22, 2026

(54) SYSTEM AND METHOD FOR GENERATING SYNTHETIC DATA WITH MASKED TRANSFORMERS

(71) Applicant: Leidos, Inc., Reston, VA (US)

(72) Inventors: Paul F. Roysdon, Boeme, TX (US); Manbir S. Gulati, Frederick, MD (US)

(73) Assignee: Leidos Inc., Reston, VA (US)

( * ) Notice: Subject to any disclaimer, the term of this patent is extended or adjusted under 35 U.S.C. 154(b) by 697 days.

(21) Appl. No.: 18/314,181

(22) Filed: May 9, 2023

Related U.S. Application Data

(60) Provisional application No. 63/339,878, filed on May 9, 2022.

(51) Int. Cl.
*G06N 3/0475* (2023.01)

(52) U.S. Cl.
CPC .................................. *G06N 3/0475* (2023.01)

(58) Field of Classification Search
CPC .................................................... G06N 3/0475
See application file for complete search history.

(56) References Cited

U.S. PATENT DOCUMENTS 10,664,381 B2 5/2020 Walters
10,679,124 B1 6/2020 Corrado et al.
2009/0204631 A1 8/2009 Pomroy et al.
2013/0110766 A1 5/2013 Promhouse et al.
2016/0019721 A1 1/2016 Bare et al.
2020/0143082 A1 5/2020 Dubishar et al.
2020/0160178 A1 5/2020 Kar et al.
2021/0295172 A1 9/2021 Sultan et al.
2021/0365723 A1* 11/2021 Wagner .................. G06N 20/00
2022/0084510 A1 3/2022 Peng et al.
2022/0164655 A1* 5/2022 Gomez .................... G06N 3/08
2024/0242024 A1* 7/2024 Moon .................. G06F 40/126

OTHER PUBLICATIONS

Majmundar, Kushal, et al. “Met: Masked encoding for tabular data.” arXiv preprint arXiv:2206.08564 (2022) (Year: 2022).*
Solatorio, Aivin V., and Olivier Dupriez. “Realtabformer: Generating realistic relational and tabular data using transformers.” arXiv preprint arXiv:2302.02041 (2023). (Year: 2023).*
Jordon et al. “PATE-GAN: Generating synthetic data with differential privacy guarantees.” 1-22 International conference on learning representations. 2019. Retrieved on Aug. 7, 2023 (Aug. 7, 2023) from <https://openreview.net/pdf?id=S1zk9iRqF7>, 21 pp.

(Continued)

*Primary Examiner* — Hal Schnee
(74) *Attorney, Agent, or Firm* — Dawn-Marie Bey; Bey & Cotropia PLLC

(57) ABSTRACT

A transformer-based modeling architecture for training a generator to generate synthetic data. The architecture includes embedding models for embedding input data having multiple fields containing real data values and constructing individual embedding matrices for each of the multiple fields, a masking model for producing a set of masked fields in the embedded input dataset and replacing the real data value of each field with a mask token; and a transformer model for predicting the real data value for each mask token in each of the masked fields over multiple iterations.

16 Claims, 15 Drawing Sheets

(56) References Cited

OTHER PUBLICATIONS

International Search Report and Written Opinion for PCT Application No. PCT/US2023/066766, dated Sep. 8, 2023, 8 pp.
Vaswani et al., Attention Is All You Need, arXiv:1706.03762v5 [cs.CL] Dec. 6, 2017.
Borisov et al, Language Models Are Realistic Tabular Data Generators, arXiv:2210.06280v1 [cs.LG] Oct. 12, 2022.
Chang et al., Maskgit: Masked generative image transformer, arXiv:2202.04200v1 [cs.CV] Feb. 8, 2022.
Kotelnlkov et al., TabDDPM: Modeling Tabular Data with Diffusion Models, arXiv:2209.15421v1 [cs.LG] Sep. 30, 2022.
Lei Xu et al. in Modeling Tabular Data using Conditional GAN, 33rd Conference on Neural Information Processing Systems (NeurIPS Dec. 2019).
Zhao et al., Ctab-gan+: Enhancing tabular data synthesis, arXiv preprint arXiv:2204.00401 (2022).
Solatorio et al., Realtabformer: Generating realistic relational and tabular data using transformers, arXiv preprint arXiv:2302.02041, (2023).
Markus Ring et al., Flow-based network traffic generation using generative adversarial networks, arXiv:1810.07795v1 [cs.NI] Sep. 27, 2018.
Shuodi Hui et al., Knowledge Enhanced GAN for IoT Traffic Generation, WWW '22, Apr. 25-29, 2022, Virtual Event, Lyon, France.
Alberto Mozo et al: Synthetic flow-based cryptomining attack generation through Generative Adversarial Networks, Scientific Reports | (2022) 12:2091.
Gonik, Julia; CyberGAN: Generating High-fidelity Cybersecurity Data With Generative Adversarial Networks, Virtual Ascend 2020, Las Vegas, Nevada, Nov. 16-18, 2020.
Park, N., Mohammadi, M., Gorde, K., Jajodia, S., Park, H., Kim, Y.: Data synthesis based on generative adversarial networks. Proceedings of the VLDB Endowment 11(10), 1071-1083 (2018).
Lin, Z., et al.: Using gans for sharing networked time series data: Challenges, initial promise, and open questions. In: Proceedings of the ACM Internet Measurement Conference. pp. 464-483 (2020).
Shengzhe Xu et al., STAN: Synthetic Network Traffic Generation with Generative Neural Models, arXiv:2009.12740v2 [cs.LG] Aug. 3, 2021.
Ian Goodfellow, NIPS 2016 Tutorial: Generative Adversarial Networks, arXiv:1701.00160v4 [cs.LG] Apr. 3, 2017.

* cited by examiner

SYSTEM AND METHOD FOR GENERATING SYNTHETIC DATA WITH MASKED TRANSFORMERS

CROSS-REFERENCE TO RELATED APPLICATIONS

The present application claims benefit of priority to U.S. Provisional Patent Application No. 63/339,878, entitled "Modeling and Generation of Network Traffic For Network Security, Simulation and Monitoring," filed May 9, 2022, the entirety of which is incorporated herein by reference.

BACKGROUND

Technical Field

The general technical field of the exemplary embodiments is synthetic data generation and more particularly, transformer-based models for generating synthetic tabular data.

Description of Related Art

In recent years, generative models have attracted significant attention in the field of deep learning due to their ability to synthesize high-quality data and learn the underlying structure of complex datasets. Such models have been successfully applied to various data types, including images, text, and tabular data.

The development of effective synthetic tabular data generators is crucial for numerous reasons including: privacy preservation, data augmentation, model interpretability, and anomaly detection. Prior work in this domain has produced a myriad of generative models, also referred to as deep tabular generators, including Generative Adversarial Networks (GANs), Variational Autoencoders (VAEs), Autoregressive Transformer, and Diffusion models. Although these existing deep tabular generator models strive to address the challenges associated with tabular data generation, there is still room for exploration and improvement. Specifically, in terms of robustness, scalability, and privacy preservation, particularly when handling missing data. These features are particularly important in fields like healthcare, finance, and social sciences, where tabular data is prevalent. The heterogeneous nature of tabular data, characterized by its diverse data types, distributions, and relationships, presents distinct challenges not present in other domains.

Accordingly, the need exists in the art for synthetic tabular data generators which effectively generate robust synthetic data, are scalable and preserve privacy in underlying training data.

SUMMARY OF THE EMBODIMENTS

In a first exemplary embodiment, a transformer-based modeling architecture for training a generator to generate synthetic data includes: at least one embedding model for embedding input data, wherein the input data includes multiple fields $F_{i,j}$ containing real data values and the at least one embedding model constructs l embedding matrices, one for each of the multiple fields $F_{i,j}$; a masking model for producing a set of unmasked fields $$F_i^u$$

and a set of masked fields $$F_i^m$$

for each row $F_i$ of data in the embedded input dataset and replacing the real data value of each field in the masked set $$F_i^m$$

with a mask token, wherein a training distribution $$|F_i^m|$$

of the masked fields $$F_i^m$$

in each row $F_i$ of data is uniform; and a transformer model for predicting the real data value for each mask token in each of the masked fields $$F_i^m$$

over multiple iterations.

In a second exemplary embodiment, a process for training a transformer-based generator model to generate synthetic data includes: embedding, by at least one embedding model, input data, wherein the input data includes multiple fields $F_{i,j}$ containing real data values and the at least one embedding model constructs l embedding matrices, one for each of the multiple fields $F_{i,j}$; producing, by a masking model, a set of masked fields $$F_i^m$$

for each row $F_i$ of data in an embedded input dataset and replacing the real data value of each field in the masked set $$F_i^m$$

with a mask token, wherein a training distribution $$|F_i^m|$$

of the masked fields $$F_i^m$$

in each row $F_i$ of data is uniform; and predicting, by a transformer model, the real data value for each mask token in each of the masked fields $$F_i^m$$

over multiple iterations.

In a third exemplary embodiment, a transformer-based model for generating synthetic data includes: at least one embedding model for embedding an input dataset, wherein the input dataset has a predetermined format and includes multiple fields $F_{i,j}$ indicative of a real value and the at least one embedding model constructs l embedding matrices, one for each of the multiple fields $F_{i,j}$; and a transformer model for receiving a first embedded input dataset wherein each real world value for each of the multiple fields $F_{i,j}$ is masked with a mask token, and generating a synthetic data value commensurate with the real data value for the mask token in one or more of the masked fields $$F_i^m$$

over multiple iterations, until every mask token in the first embedded input dataset includes a synthetic data value.

BRIEF DESCRIPTION OF THE FIGURES

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Definitions

Field: A column of values within the dataset, all containing the same type of value.

Categorical Fields: Fields within the data which take on values from a set of fixed values and do not have an obvious ordering between categories, e.g., Sex (Male, Female).

Numerical Fields: Fields which take on values from across real numbers or integer values. For example House price (400k, 225k . . . ).

Embedding: A table of values which allow us to convert each categorical value into a vector. Each unique categorical value is mapped to a unique vector. Male→[0.5, −0.1 . . . ] Female→[0.8, 0.2 . . . ].

Quantizer: A block responsible for converting real or integer values into a set of fixed values. We do this so we can use an embedding before feeding values to the transformer. In this paper we use K-Means, but we tried many different quantizers in our design. An example quantizer would be mapping all values to something in [0.0, 0.1, 0.2, 0.3 . . . ].

Ordered Embedding: A special embedding which is unique to our design to allow the ordering of the values to be considering in the embeddings.

Masking: Replacing values with a mask token indicating to the model that value is missing. The model then learns to predict the value which is missing.

Transformer: A general neural network which specifically tries to learn relationships between input entries Dynamic Linear Layer: A typical model would used a fixed linear layer, we instead use a dynamic linear layer which is generated on the fly. It is generated using the same procedure as the ordered embedding.

Synthetic Data: A dataset of generated data from the model which resembles the real data statistically.

Transformers, originally designed for natural language processing tasks, have had tremendous success in the NLP (Natural Language Processing) domain, leading to significant advancements in a variety of applications. Their powerful capacity for modeling complex dependencies and generalizing across applications has spurred researchers to extend transformers to other data types, such as images and audio. A description of the initial transformer concept can be found in Vaswani et al., Attention Is All You Need, arXiv: 1706.03762v5 [cs.CL] 6 Dec. 2017, which is incorporated herein by reference.

In embodiments herein, transformers are used as synthetic tabular data generators, further expanding their cross-domain applicability. Specifically, the embodiments implement Masked Transformers (MT) as tabular data generators which achieve state-of-the-art performance across a wide array of datasets.

Figure 1A:
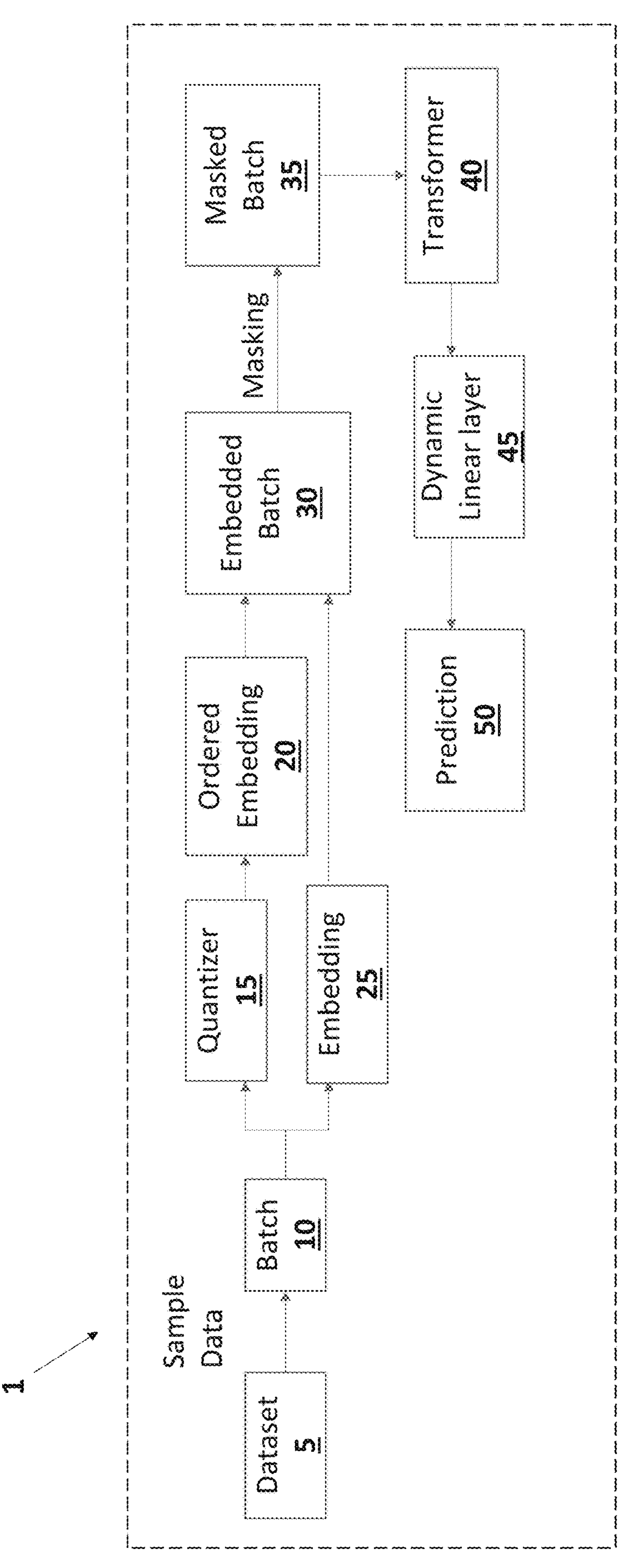
FIGS. 1*a* and 1*b* show an exemplary training process diagram (FIG. 1*a*) and exemplary data set masking (FIG. 1*b*) for training a masked transformer model data generator (TabMT) in accordance with one or more embodiments herein.

The embodiments described herein implement a MT architecture design referred to throughout this specification as TabMT. TabMT is general enough to work across many tasks and scenarios. A high level diagram of a TabMT model training process 1 is shown in FIG. 1*a*. FIG. 1*a* includes collection of a full, real data set 5 relevant to the domain of interest. In the particular example discussed herein, the domain data set supports tabular data, which includes both categorical and numerical data fields populated with relevant sample data. Each field in the data set is a column of values, all containing the same type of value. By way of example, categorical fields are fields within the data which take on values from a set of fixed values and do not have an obvious ordering between categories, e.g., Sex (Male, Female), eye color, true/false, etc. Whereas numerical fields are fields which take on values from across real numbers or integer values, e.g., House price (400k, 225k . . . ), the height and weight of a person, temperature, etc. Data sets of sample data are batched together 10.

Next numerical data from the batch is fed to a quantizer block, (e.g., K-Means) 15 for converting the real or integer values into a set of fixed values (e.g., mapping all values to something in [0.0, 0.1, 0.2, 0.3 . . . ]), prior to applying ordered embedding 20. This ordered embedding allows for ordering of the values to be considered in the embeddings. The categorical data from the batch is subject to embedding 25, wherein a table of values is used to convert each unique categorical value into a unique vector (e.g., Male "value" is mapped to vector [0.5, −0.1 . . . ] and Female "value" is mapped to vector [0.8, 0.2 . . . ]).

Next the embedded batch 30, including both the embedded numerical data and the embedded categorical data, is subject to masking, creating a masked batch 35, wherein values within the embedded batch data are replaced with a mask token, indicating to the model that the masked value is missing. The model then learns to predict the value which is missing. By way of example, if the original value is 0.5 this would first be mapped to a vector if it is not masked. If it is masked then it is replaced with the vector corresponding to a missing value. The model would then need to predict that 0.5 was the original value based on the other unmasked values. Specific to our preferred embodiment, by masking a random percentage of tokens between 0%-100%, the TabMT architecture is also able to be used to generate synthetic data—specifically of tabular data—as described further herein below.

As part of the prediction process, the model uses a transformer 40, e.g., a neural network (NN), to learn relationships between input entries within the masked batch and maps the input data to output data using a dynamic linear layer 45 which is generated on the fly (instead of a fixed linear layer). The dynamic linear layer 45 is generated using the same procedure as the ordered embedding.

Figure 1B:
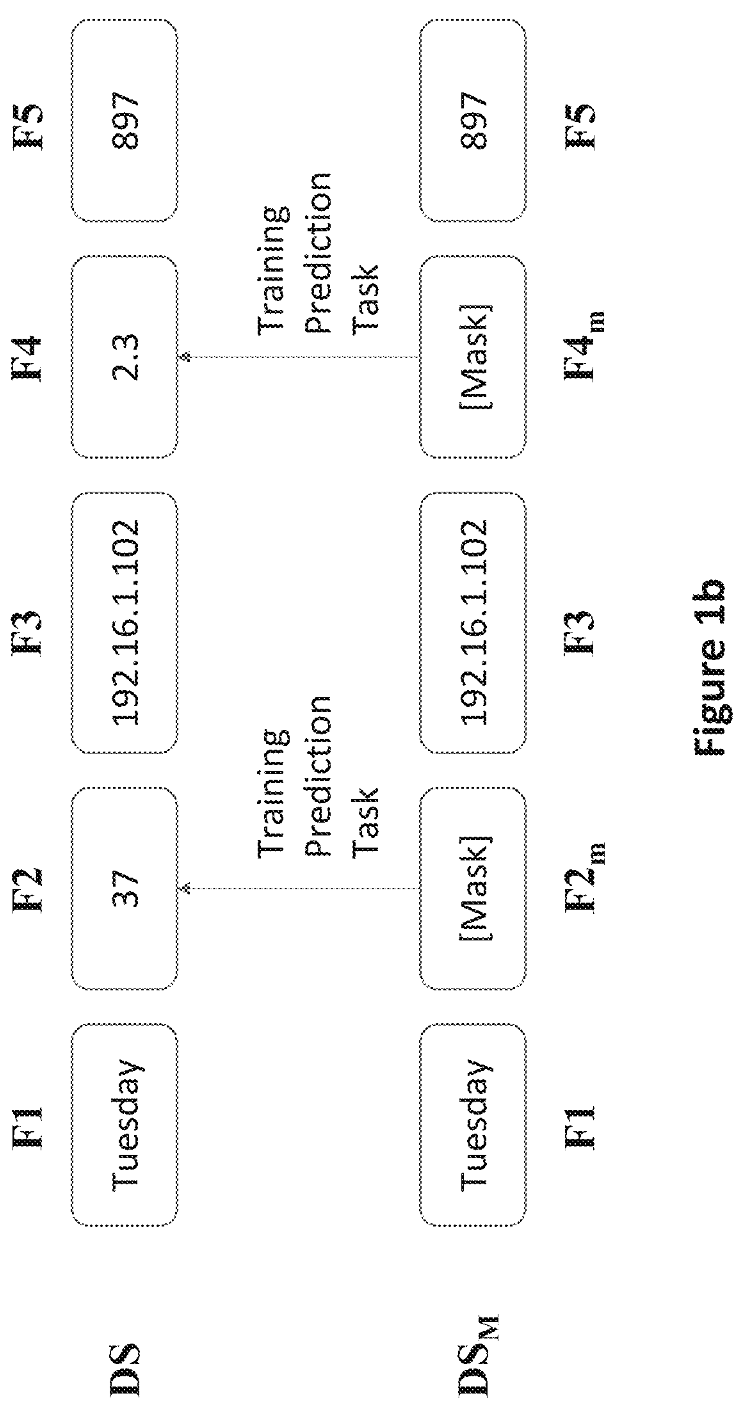

By way of example only, FIG. 1*b* provides an example of an input training data set DS containing fields F1 to F5 before masking and after random masking of certain fields in the input training data set $DS_M$ wherein $\mathbf{F2}_m$ and $\mathbf{F4}_m$ are masked for training the model. The exemplary data set DS includes both categorical (F1) and numerical (F2 to F5) fields. This random masking of data sets is repeated numerous times during training which trains the model to predict the masked field values, e.g., $\mathbf{F2}_m$ and $\mathbf{F4}_m$, based on the other known field values in the set, e.g., F1, F3 and F5.

Figure 2A:
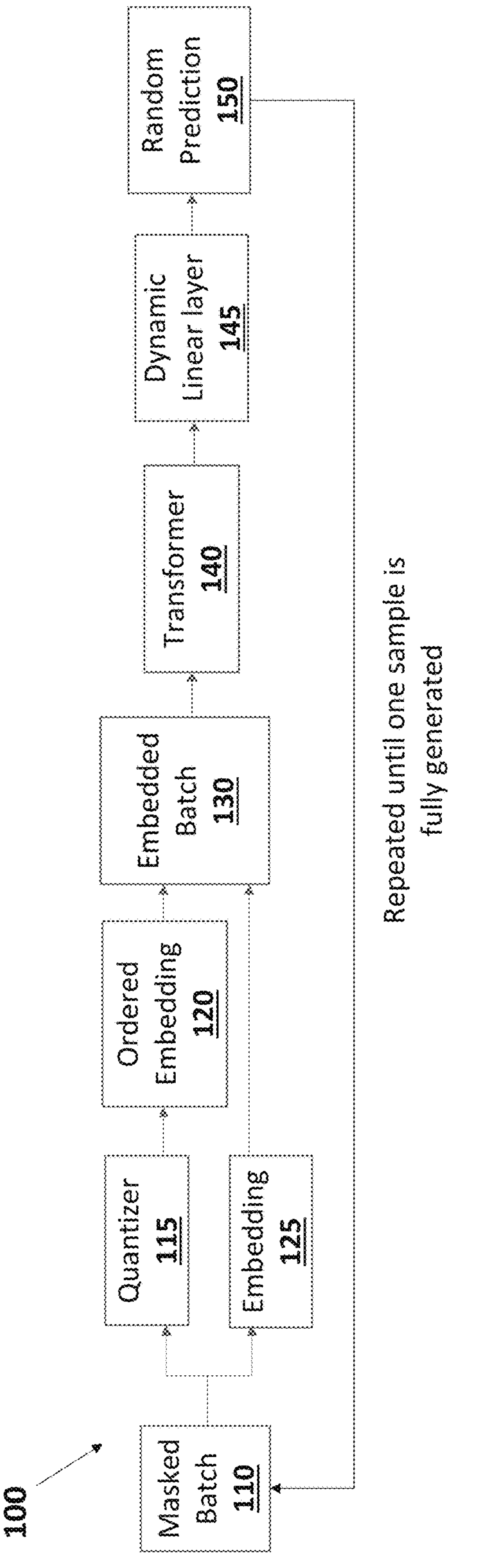
FIGS. 2*a* and 2*b* show an exemplary synthetic data generation process diagram (FIG. 2*a*) and exemplary batch data masking sequence (FIG. 2*b*) for generating synthetic tabular data using a trained masked transformer model data generator (TabMT) in accordance with one or more embodiments herein.
Figure 2B:
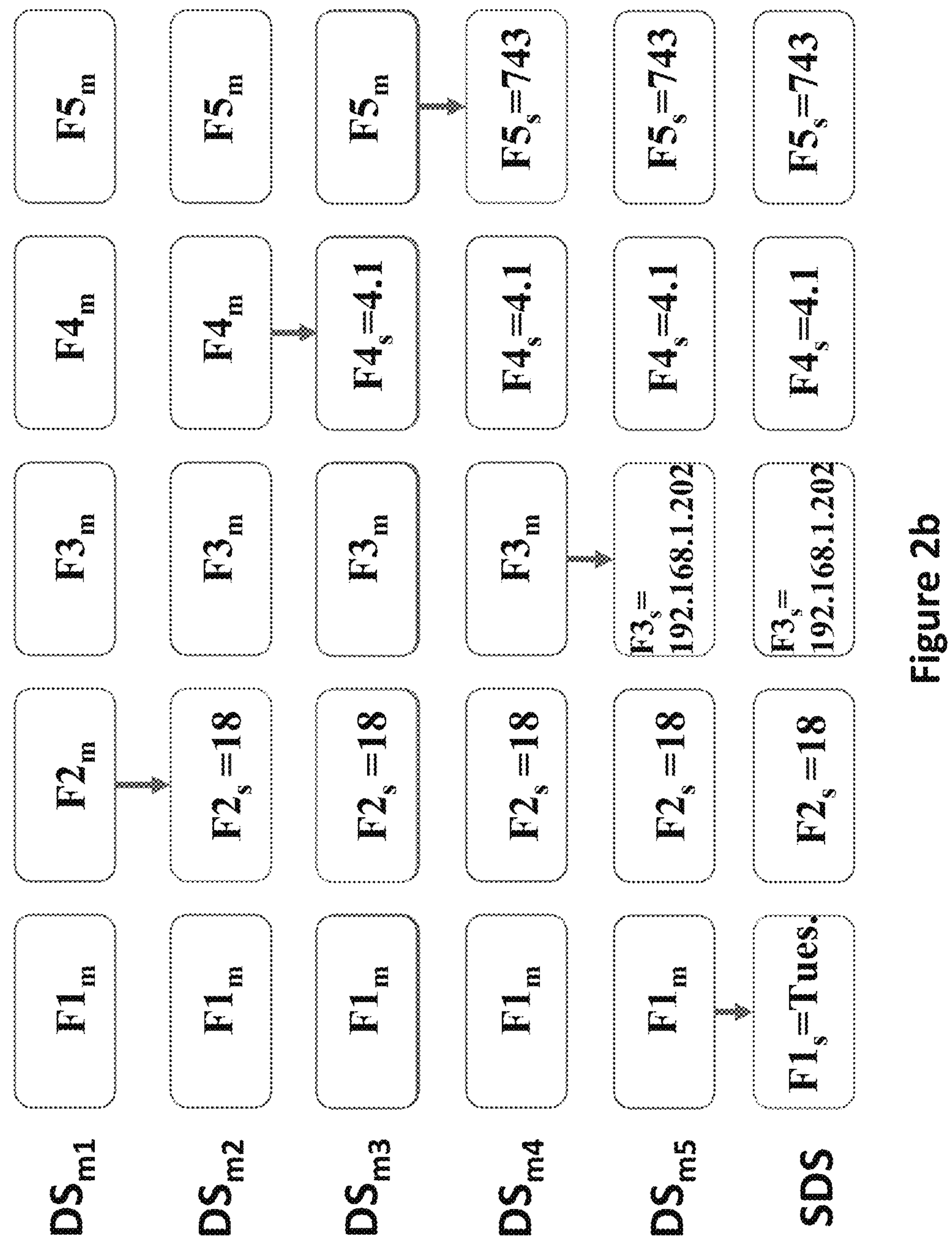

Referring to FIGS. 2*a* and 2*b*, the trained TabMT model is not only able to predict missing field values, it is able to generate synthetic data which statistically resembles real data. (e.g., DS). In FIG. 2*a*, the process for generating synthetic data 100 using the TabMT model, is similar in most respects to the training process. In the process 100, the numerical fields of the masked data batch 110 (see FIG. 2*b*) is processed by quantizer 115 and subject to ordered embedding 120 and the categorical data fields are subject to embedding 125 to produce the embedded batch 130. Transformer 140 generates a randomly predicted value for one or more masked fields in accordance with its training, maps the randomly predicted value to output data using dynamic linear layer 145 and returns a randomly predicted data set, including the one or more predicted values, back to the start of the generation process as a next masked batch and the process repeats until one sample data set is fully generated.

FIG. 2*b* provides a simplified diagram of masking during generation of a synthetic data set SDS in accordance with the process in FIG. 2*a*. In this example, in the initial masked batch data set $DS_{m1}$, all field values are masked $\mathbf{F1}_m$, $\mathbf{F2}_m$, $\mathbf{F3}_m$, $\mathbf{F4}_m$ and $\mathbf{F5}_m$. After iterations through the TabMT model process of FIG. 2*a*, a synthetic value for $\mathbf{F2}_s$=18 is generated, and in the next masked batch data set $DS_{m2}$, field values are masked $\mathbf{F1}_m$, $\mathbf{F2}_s$, $\mathbf{F3}_m$, $\mathbf{F4}_m$ and $\mathbf{F5}_m$ and a synthetic value for a next field, e.g., $\mathbf{F4}_s$=4.1 is generated and so on, as exemplified in FIG. 2*b*, until a complete synthetic data set SDS is generated.

TabMT uses transformer-based modeling. In the prior art, transformer-based language models are used to learn human language via token prediction. Given a context of either previous tokens in time, or a random subset of tokens within a window, the model is tasked with predicting the remaining tokens using either an autoregressive model (see Borisov et al, Language Models Are Realistic Tabular Data Generators, arXiv:2210.06280v1 [cs.LG] 12 Oct. 2022, which is incorporated herein by reference) or masked model, respectively. Both these paradigms have shown success across a wide range of tasks and domains. Masked Language models are traditionally used for their embeddings, although some papers have explored masked generation of content, e.g., image generation, as described in Chang et al., Maskgit: Masked generative image transformer, In Proceedings of the IEEE/CVF Conference on Computer Vision and Pattern Recognition, pages 11315-11325 (2022). In the present embodiments, TabMT demonstrates transformer-based modeling effectiveness for modeling and generating tabular data.

The present embodiments utilize a variation on the pre-training of deep bidirectional transformers for language understanding ("BERT") which establishes a masking procedure to train bidirectional transformers. Given an N by/dataset F, for each row $F_i$, the transformer is provided with a set of unmasked fields $$F_i^u$$

and a set of masked fields $$F_i^m.$$

Each field in the masked set $$F_i^m$$

has its value replaced with a mask token. The model is then tasked with predicting the original value for all masked tokens. In BERT, the row $F_i$ is partitioned into the unmasked and masked sets by conducting a bernoulli trial on each field $F_{i,j}$ such that $$P(F_{i,j} \in F_i^m) = 0.15.$$

The BERT masking procedure produces a strong embedding model, but not a strong generator. To understand why, we can look at the distribution of masked sets. As a result of the repeated bernoulli trials during masking, the size of the masked set for each row $$|F_i^m|$$

will follow a binomial distribution. However, when generating data one field $F_{i,j}$ at a time, the model will inference on masked subset sizes from 0 . . . l−1 once each. We would like the training distribution of $$|F_i^m|$$

to be uniform, matching the uniform distribution encountered when generating data. With a fixed masking probability p we will instead encounter a binomial distribution centered around p·l. However, if we instead mask with probability p~U(0, 1), sampling p for each row $F_i$, we will train with uniform subset sizes. Fixing this train and inference mismatch is critical to forming a strong generator.

A traditional autoregressive generator would generate fields from $F_{i,0} \ldots F_{i,l-1}$, sequentially. However, tabular data, unlike language, does not have an inherent ordering. Generating fields in a fixed order introduces another mismatch between training and inference. During training $$F_i^m$$

will take on the distribution $$P(F_i^m = s) = \frac{1}{\binom{l}{|s|} \cdot l} \quad (1)$$

When generating in a fixed order, the model will infer across/distinct subsets and no others. However, if we instead infer in a random order, then at generation step 0≤t<l, the distribution of $$F_i^m$$

will be given by:

$$P(F_i^m = s) = \frac{t! \cdot (l-t)!}{l!} = \frac{1}{\binom{l}{t}} \quad (2)$$

Since we encounter each t exactly once, this is identical to the masking distribution encountered during training, fixing the discrepancy caused by generating fields in a fixed order. One skilled in the art will appreciate that the duality between uniform masking and shuffling means TabMT can equivalently be formulated as an autoregressive model where inputs are shuffled during training and inference. To validate our randomized generation procedure experimentally, we tested a variety of fixed orderings but did not find any which reliably improved accuracy.

A transformer model will typically have an N×d input embedding matrix E, where N is the number of unique input tokens and d is the transformer dimension. Because tabular data is heterogenous, we instead construct 1 embedding matrices, one for each field. Each embedding matrix will have a different number of unique tokens N.

For categorical fields we use a standard embedding matrix initialized with a Normal distribution. For each continuous, e.g., numerical, field we construct an N×d ordered embedding O from its N×d unordered embedding matrix E and two d dimensional endpoint vectors a and b.

To construct each ordered embedding matrix O, we first cluster the values of the continuous field using K-Means. We consider the maximum number of clusters a hyperparameter. Let v be the N dimensional vector of ordered cluster centers. We construct an N dimensional vector of ratios r using min max normalization such that $$r_i = \frac{v_i - \min(v)}{\max(v) - \min(v)} \quad (3)$$

We use the ratio vector r to construct each ordered embedding in O as $$O_i = E_i + r_i \cdot a + (1 - r_i) \cdot b \quad (4)$$

This structure allows the model to both take advantage of the ordering of the properties and add unordered embedding information to each cluster. The unordered embeddings are useful in attention, multimodal distributions, and encoding semantic separation between close values. We use this same structure to dynamically construct the weights of the output linear layer.

Relying too heavily on the unordered embeddings might negate the benefit of our ordered embedding, as information isn't effectively shared between close values. To combat this, we bias TabMT to rely on the ordering as much as possible. For continuous fields, we zero-init the unordered embedding matrix E. In contrast, the endpoint vectors a and b use a normal distribution of magnitude 0.05. Additionally, we include a learned temperature on the output which allows the model to sharpen the predicted distribution as needed. Each field's predicted distribution ŷ is given by Equation 5

$$\hat{y} = \frac{e^{z/(t_l \cdot t_u)}}{\sum_j e^{z/(t_l \cdot t_u)}} \quad (5)$$

Where z is an N dimensional vector of logits, $t_l$ is the learned temperature, and $t_u$ is the user-defined temperature.

Accordingly, the TabMT processes differ from BERT in the following critical ways: TabMT use a separate embedding matrix for each field; to handle continuous entries, TabMT uses ordered embeddings and a quantizer, and uses dynamic linear layers to pair with the ordered embeddings; TabMT randomly masks between 0% and 100% of data, BERT always masks 15% of its tokens; TabMT generates fields in a random order, whereas BERT cannot generate data and is not used to generate data. Further, BERT is designed for human language, not predicting (or generating) tabular data.

TabMTs structure is particularly well suited for generating tabular data, for a number of reasons. First, TabMT accounts for patterns bidirectionally between fields. Tabular data's lack of ordering means bidirectional learning will likely produce better understanding and embeddings within the model.

Second, a "prompt" to a tabular generator is not likely sequential. TabMT's masking procedure allows for arbitrary prompts to the model during generation. This is unique as most other generators have very limited conditioning capabilities.

Third, missing data is far more common in tabular data than in other domains. TabMT is able to learn even with values missing by setting their masking probability to 1. Other generators require us to impute data separately before we can generate high-quality cleaned samples.

The sections below present a comprehensive evaluation of TabMT's effectiveness across an extensive range of tabular datasets. The analysis involves a thorough comparison with state-of-the-art approaches, encompassing nearly all generative model families. To ensure a robust assessment, we evaluate across several dimensions and metrics.

For the data quality and privacy experiments described below, we use the same datasets as those used in the recent TabDDPM paper to Kotelnlkov et al., TabDDPM: Modeling Tabular Data with Diffusion Models, arXiv:2209.15421v1 [cs.LG] 30 Sep. 2022, which is incorporated herein by reference in its entirety. Listed in Table 1, these 15 datasets range in size from approximately 400 samples to approximately 150,000 samples. They contain continuous, categorical, and integer features. The datasets range from 6 to 50 columns.

TABLE 1

| Abbr | Name | # Train | # Validation | # Test | # Num | # Cat | Task type |
|---|---|---|---|---|---|---|---|
| AB | Abalone | 2672 | 669 | 836 | 7 | 1 | Regression |
| AD | Adult ROC | 26048 | 6513 | 16281 | 6 | 8 | Binclass |
| BU | Buddy | 12053 | 3014 | 3767 | 4 | 5 | Multiclass |
| CA | California Housing | 13209 | 3303 | 4128 | 8 | 0 | Regression |
| CAR | Cardio | 44800 | 11200 | 14000 | 5 | 6 | Binclass |
| CH | Churn Modelling | 6400 | 1600 | 2000 | 7 | 4 | Binclass |
| DI | Diabetes | 491 | 123 | 154 | 8 | 0 | Binclass |
| FB | Facebook Comments Volume | 157638 | 19722 | 19720 | 50 | 1 | Regression |
| GE | Gesture Phase | 6318 | 1580 | 1975 | 32 | 0 | Multiclass |
| HI | Higgs Small | 62751 | 15688 | 19610 | 28 | 0 | Binclass |
| HO | House 16H | 14581 | 3646 | 4557 | 16 | 0 | Regression |
| IN | Insurance | 856 | 214 | 268 | 3 | 3 | Regression |
| KI | King | 13832 | 3458 | 4323 | 17 | 3 | Regression |
| MI | MiniBooNE | 83240 | 20811 | 26013 | 50 | 0 | Binclass |
| WI | Wilt | 3096 | 775 | 968 | 5 | 0 | Binclass |

For the scaling experiments, the CIDDS-001 dataset, which consists of Netflow traffic from a simulated small business network is used. A Netflow consists of 12 attributes (Table 2), which we postprocess into 16 attributes (Table 3).

TABLE 2

| Field | Type |
|---|---|
| Date | timestamp |
| Source IP | categorical |
| Destination IP | categorical |
| Protocol | categorical |
| Source Port | categorical |
| Destination Port | categorical |
| Duration | continuous |
| Bytes | ordinal |
| Packets | ordinal |
| Flags | categorical |
| Type of Service | categorical |

TABLE 3

| Field | Cardinality |
|---|---|
| Weekday | 7 |
| Hour | 24 |
| Minute | 60 |
| Second | 60 |
| Millisecond | 1000 |
| Source IP | 51092 |
| Destination IP | 50923 |
| Protocol | 5 |
| Source Port | 61700 |
| Destination Port | 61448 |
| Duration | 37787 |
| Bytes | 181536 |
| Packets | 10489 |
| Flags | 34 |
| Type of Service | 5 |

This dataset is extremely large with over 30 million rows and field cardinalities in the tens of thousands. Other datasets listed all have cardinalities below 50. Unlike our other benchmarks, we purposely do not quantize the continuous variables here to further test the scaling of our model. In other words, every unique value is treated as a separate category in our prediction process.

For comparison, four prior art techniques are used, one from each major family of deep generative models.

TVAE is one of the first deep tabular generation techniques and introduces two models a GAN and a VAE as described by Lei Xu et al. in Modeling Tabular Data using Conditional GAN, 33rd Conference on Neural Information Processing Systems (NeurIPS 2019), which is incorporated herein by reference. As discussed below, TabMT is compared against the VAE, as it is the strongest VAE tabular generator of which the inventors are aware.

CTABGAN+, described in Zhao et al., Ctab-gan+: Enhancing tabular data synthesis, arXiv preprint arXiv: 2204.00401 (2022), which is incorporated herein by reference, is believed to be the state-of-the-art for GAN-based tabular data synthesis to which TabMT is compared herein.

TabDDPM, referenced above, adapts diffusion models to tabular data, with the strongest results to-date. The results of TabMT are compared thereto as described below.

Finally, RealTabFormer, described in Solatorio et al., Realtabformer: Generating realistic relational and tabular data using transformers, arXiv preprint arXiv:2302.02041, (2023), which is incorporated herein by reference, is a concurrent work on adapting autoregressive transformers to tabular and relational data. This method is most similar to TabMT, however, it uses an autoregressive transformer which demonstrates worse results than our masked transformer.

The Catboost variant of ML Efficiency is used for evaluating the quality of our synthetic data. This metric trains a CatBoost model on the synthetic data instead of a weak ensemble. The Catboost model is able to pick up on more fine-grain patterns in the data which weak classifiers cannot take advantage of. This is a holistic metric that accounts for both diversity and quality of samples. For fair comparison we use the standard hyperparameter tuning budget of 50 trials. Our full search space can be seen in Table 4. For evaluation, we generated scores and standard deviations on the test set, training a CatBoost model 10 times on 5 samples of synthetic data.

TABLE 4

| Hyperparameter | Search Space |
|---|---|
| Network Dim. | Range(16, 512, 16) |
| Num. of Heads | Choice(1, 2, 4, 8, 16) |
| Network Depth | Range(2, 12, 2) |
| Drop Path Rate | Range(0.0, 0.25, 0.05) |
| Dropout Rate | Range(0.0, 0.5, 0.05) |
| Learning Rate | LogInterval(5e-5, 5e-3) |
| Weight Decay | LogInterval(0.001, 0.03) |
| Max Steps | Range(10000, 40000, 5000) |
| Batch Size | Range(256, 2048, 256) |
| Max Bins | Range(10, 200, 10) |
| Data Mult. | 8 |
| Annealing | Cosine |
| Discretizer | KMeans |

Figure 3A:
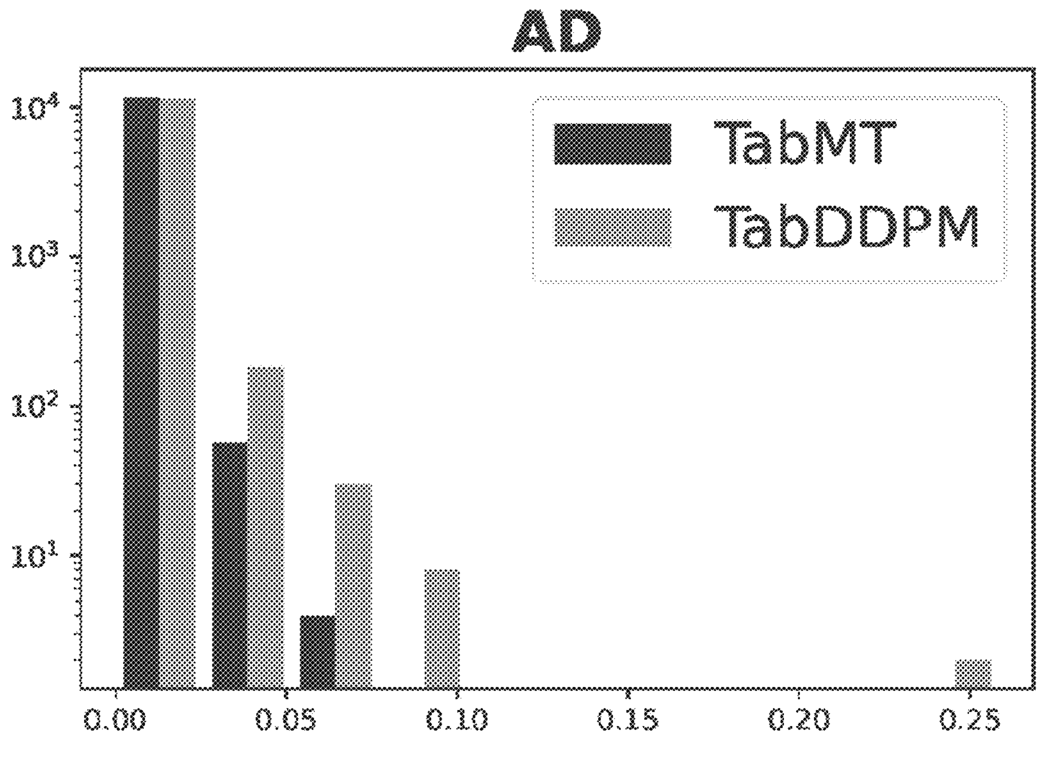
FIGS. 3*a*-3*l* provide visualizations of the distribution of correlation errors for TabMT compared to prior art tabular data synthesis models trained on known datasets AD, BU, CA, CAR, DI and KI in in accordance with one or more embodiments herein.
Figure 3B:
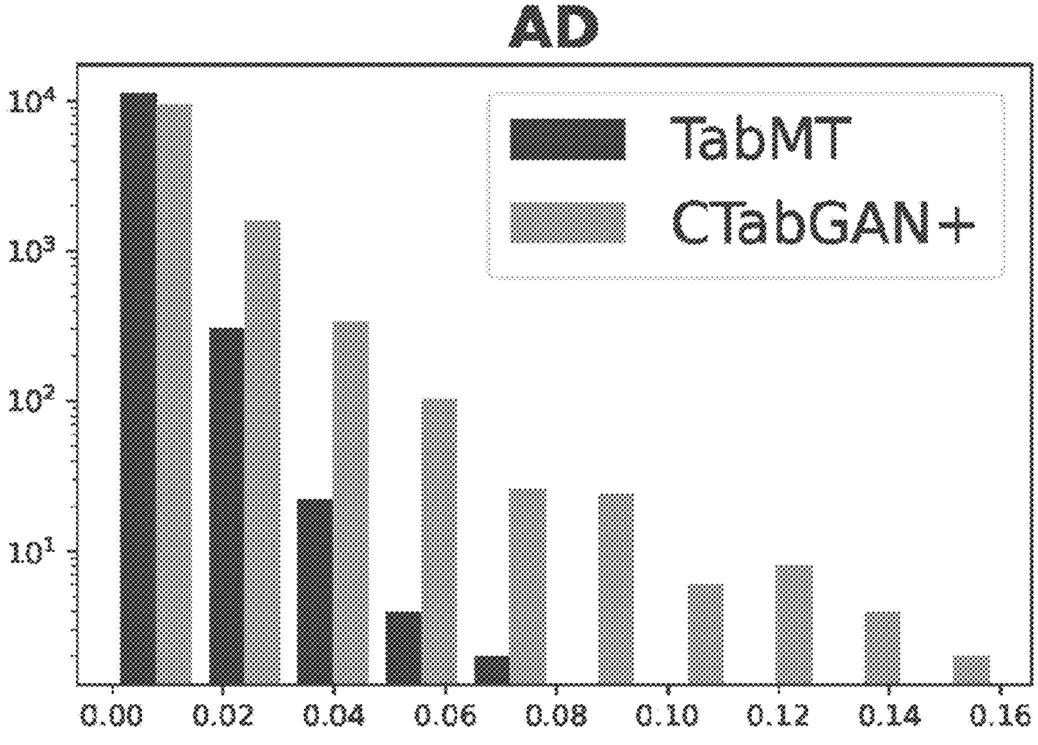
Figure 3C:
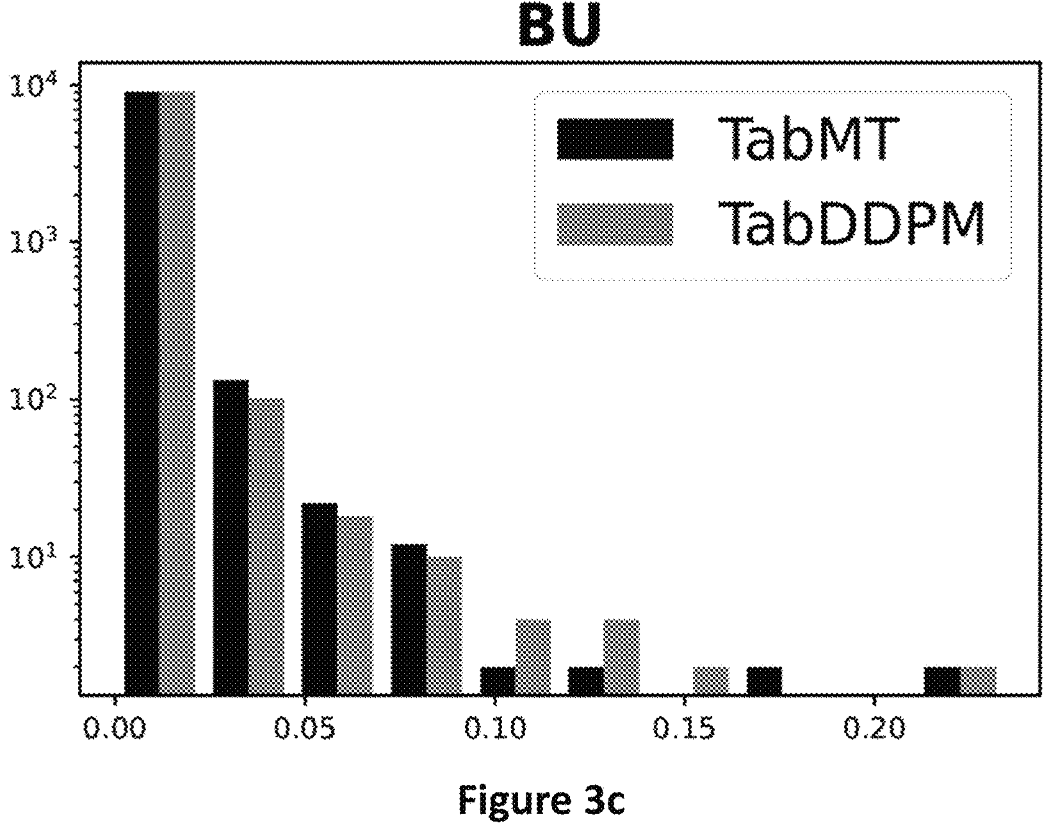
Figure 3D:
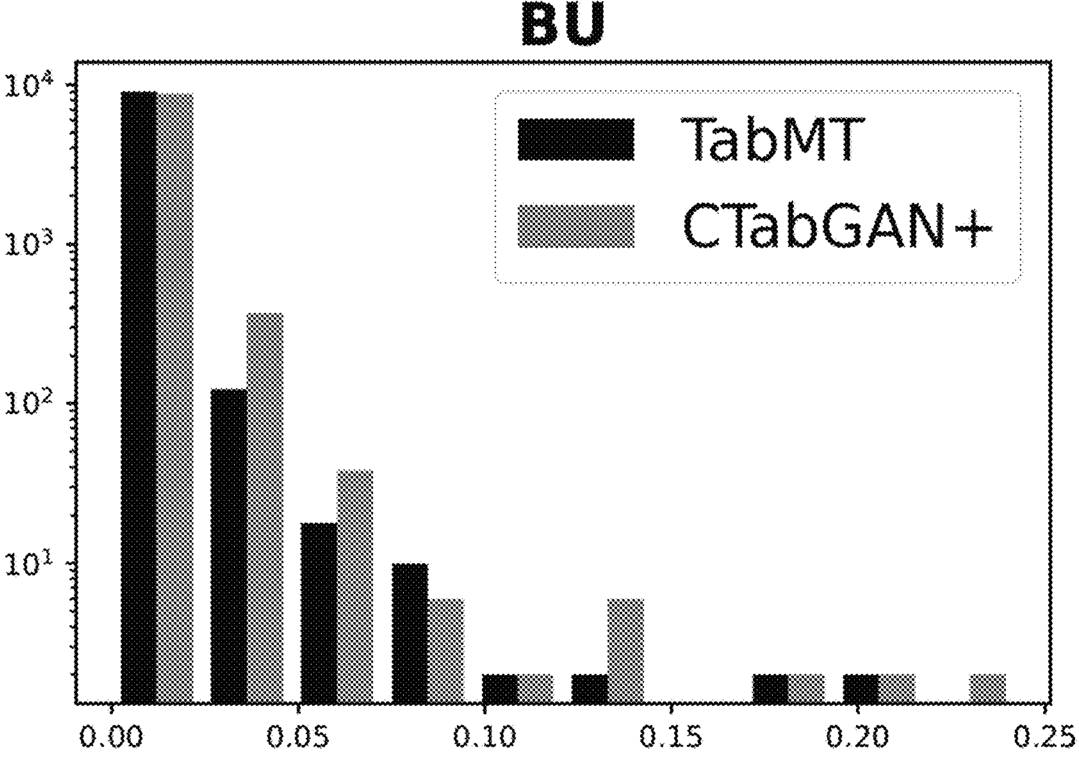
Figure 3E:
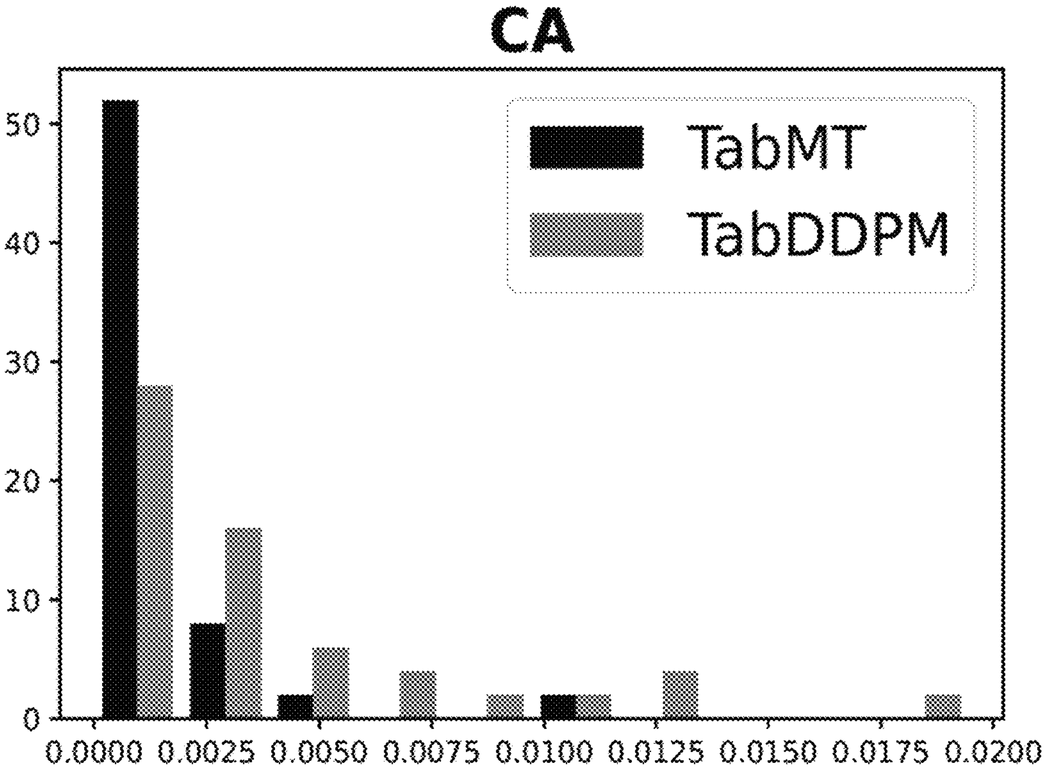
Figure 3F:
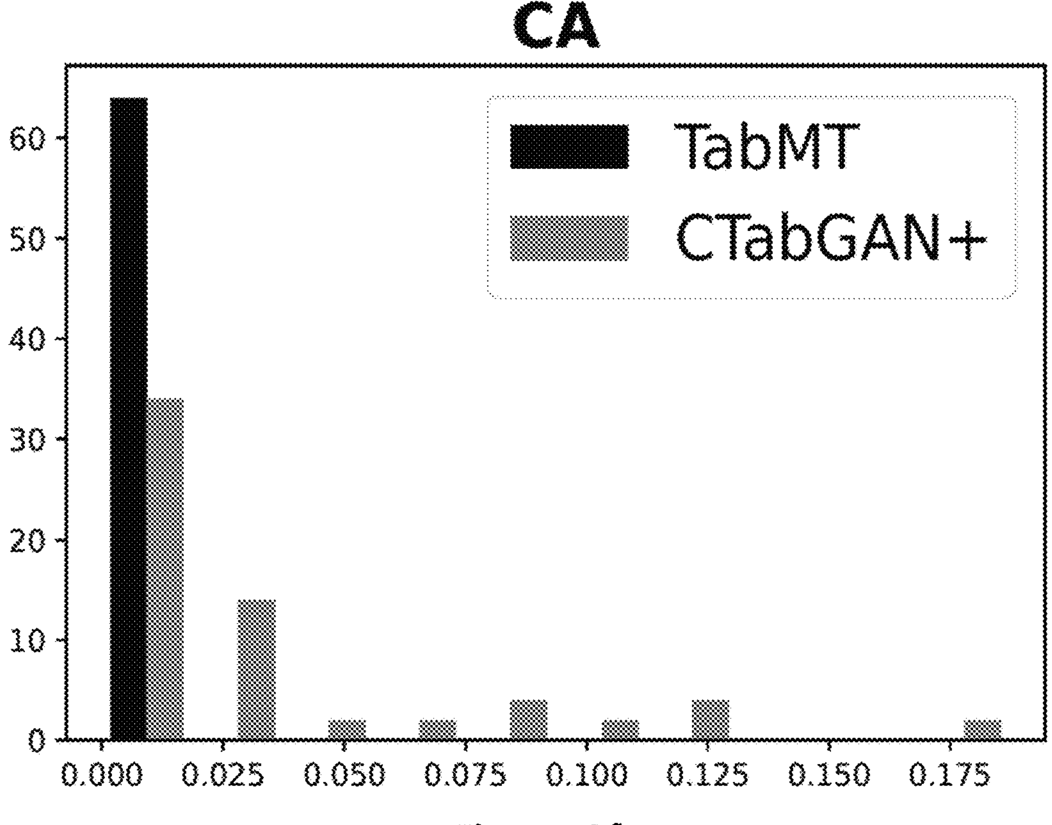
Figure 3G:
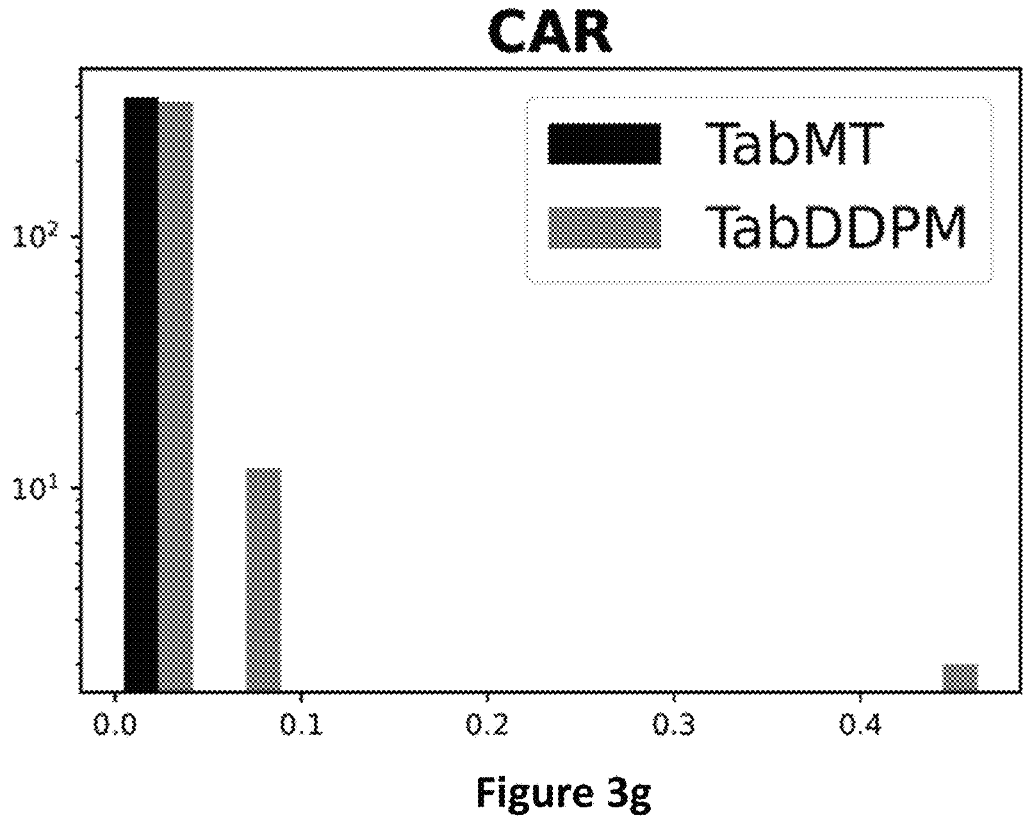
Figure 3H:
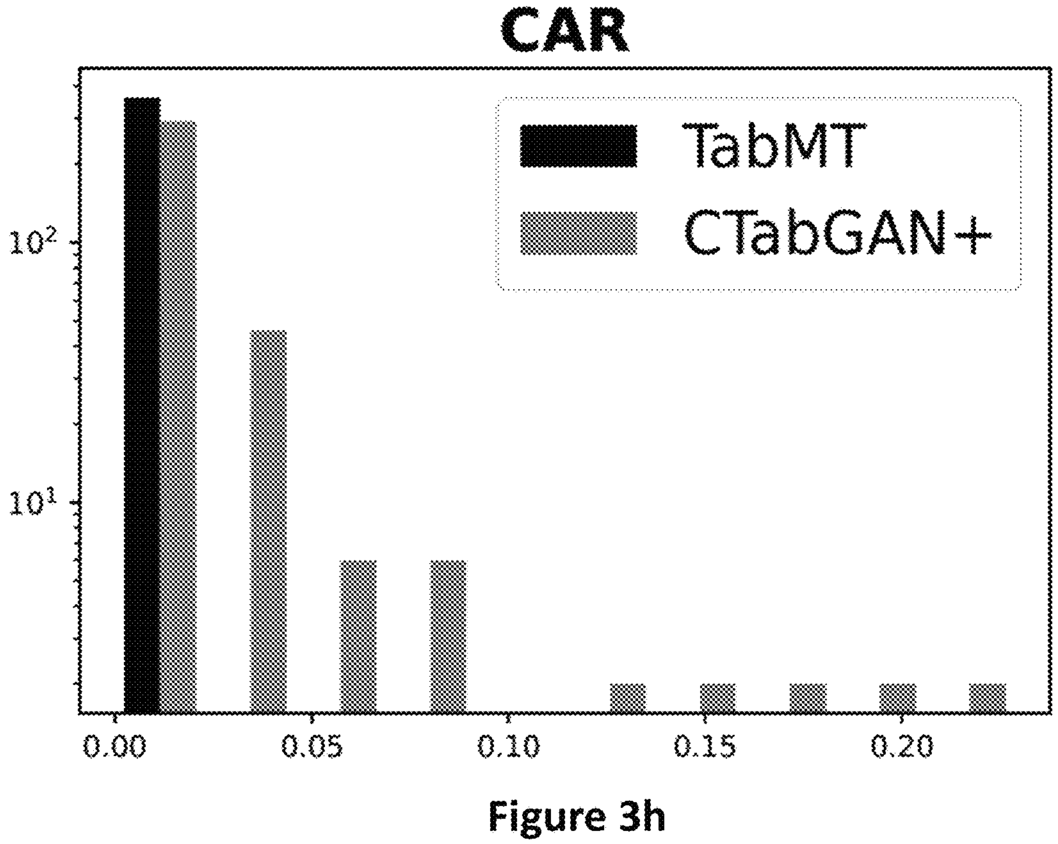
Figure 3I:
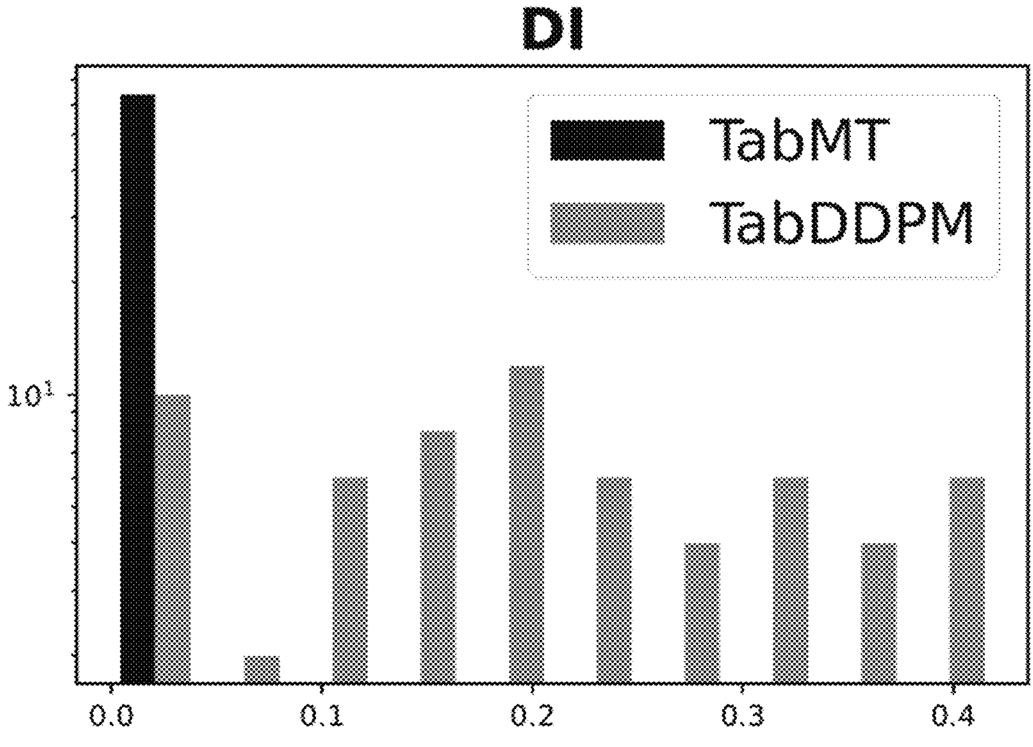
Figure 3J:
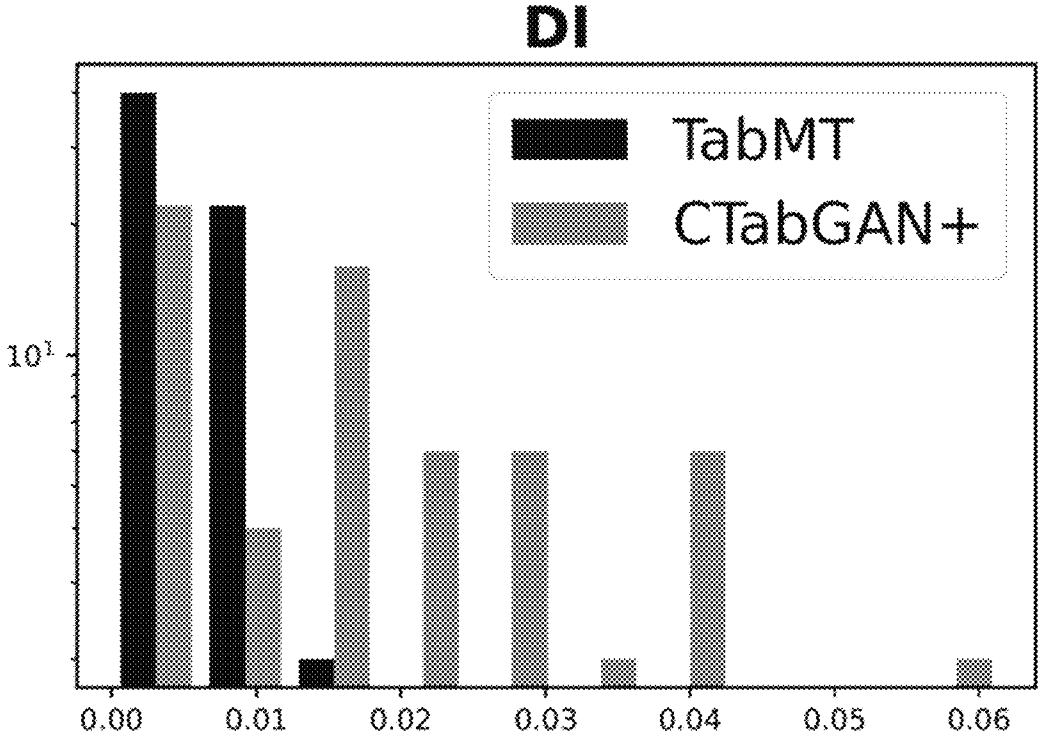
Figure 3K:
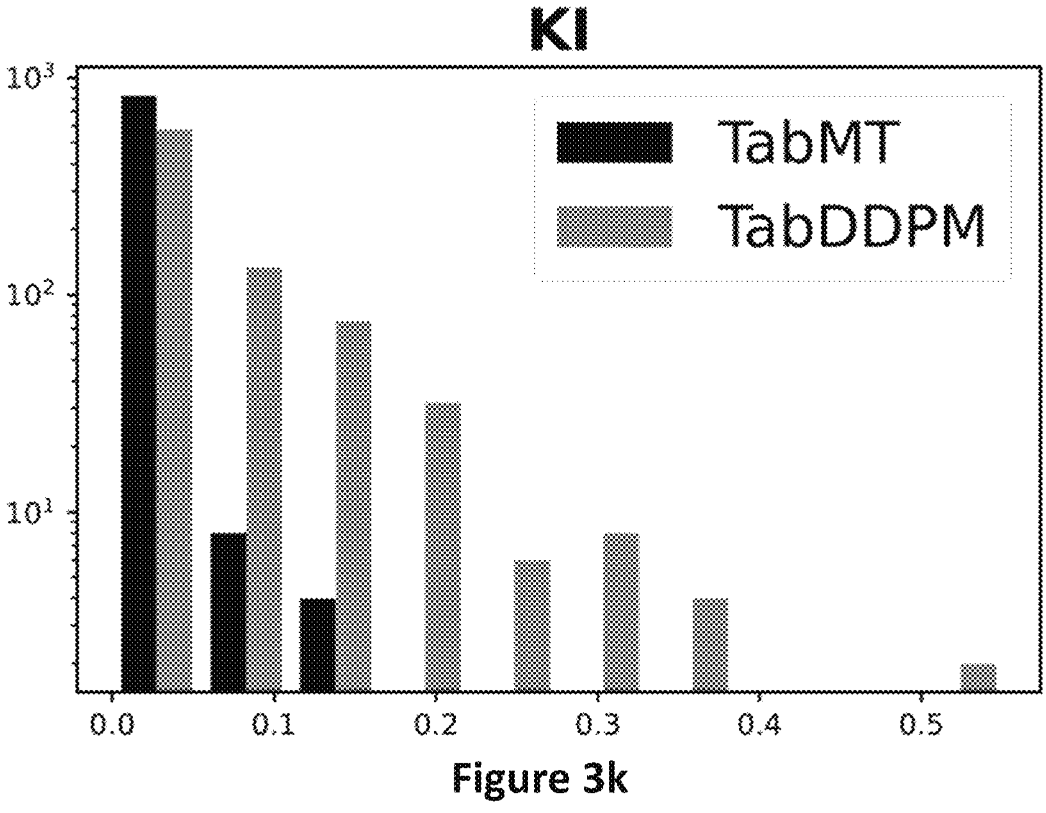
Figure 3L:
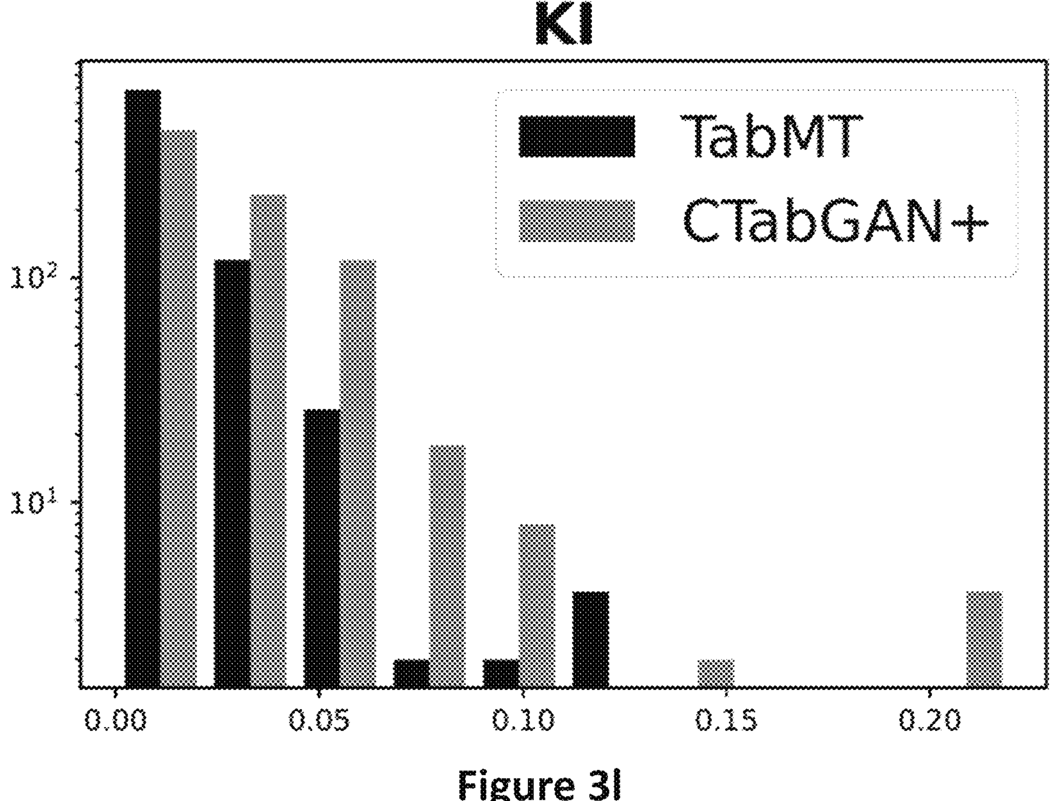

MLE scores are presented in Table 5; note that we match or exceed state-of-the-art on 11 of 15 datasets. To gain a qualitative understanding of data quality we visualize the distribution of correlation errors for datasets AD, BU, CA, CAR, DI and KI as shown in FIGS. 3*a*-3*l*. Specifically, FIGS. 3*a*, 3*b* visualize correlation errors between TabMT and TabDDPM and CTabGAN+ for dataset AB; FIGS. 3*c*-3*d* visualize correlation errors between TabMT and TabDDPM and CTabGAN+ for dataset BU; FIGS. 3*e*-3*f* visualize correlation errors between TabMT and TabDDPM and CTabGAN+ for dataset CA; FIGS. 3*g*-3*h* visualize correlation errors between TabMT and TabDDPM and CTabGAN+ for dataset CAR; FIGS. 3*i*-3*j* visualize correlation errors between TabMT and TabDDPM and CTabGAN+ for dataset DI; and FIGS. 3*k*-3*l* visualize correlation errors between TabMT and TabDDPM and CTabGAN+ for dataset KI.

TABLE 5

| DS | TVAE | CTabGAN+ | RealTab. | TabDDPM | TabMT | Real |
|---|---|---|---|---|---|---|
| AB | 0.433 ± .008 | 0.467 ± .004 | 0.504 ± .011 | 0.550 ± .010 | 0.535 ± .004 | 0.556 ± .004 |
| AD | 0.781 ± .002 | 0.772 ± .003 | 0.811 ± .002 | 0.795 ± .001 | 0.814 ± .001 | 0.815 ± .002 |
| BU | 0.864 ± .005 | 0.884 ± .005 | 0.928 ± .003* | 0.906 ± .003 | 0.908 ± .002 | 0.906 ± .002 |
| CA | 0.752 ± .001 | 0.525 ± .004 | 0.808 ± .003 | 0.836 ± .002 | 0.838 ± .002 | 0.857 ± .001 |
| CAR | 0.717 ± .001 | 0.733 ± .001 | — | 0.737 ± .001 | 0.738 ± .001 | 0.738 ± .001 |
| CH | 0.732 ± .006 | 0.702 ± .012 | — | 0.755 ± .006 | 0.741 ± .005 | 0.740 ± .009 |
| DI | 0.714 ± .039 | 0.734 ± .020 | 0.732 ± 0.027 | 0.740 ± .020 | 0.769 ± .018 | 0.785 ± .013 |
| FB | 0.685 ± .003 | 0.509 ± .011 | 0.771 ± 0.004 | 0.713 ± .002 | 0.798 ± .002 | 0.837 ± .001 |
| GE | 0.434 ± .006 | 0.406 ± .009 | — | 0.597 ± .006 | 0.605 ± .008 | 0.636 ± .007 |
| HI | 0.638 ± .003 | 0.664 ± .002 | — | 0.722 ± .001 | 0.727 ± .001 | 0.724 ± .001 |
| HO | 0.493 ± .006 | 0.504 ± .005 | — | 0.677 ± .010 | 0.619 ± .004 | 0.662 ± .003 |
| IN | 0.784 ± .010 | 0.797 ± .005 | — | 0.809 ± .002 | 0.811 ± .003 | 0.814 ± .001 |
| KI | 0.824 ± .003 | 0.444 ± .014 | — | 0.833 ± .014 | 0.876 ± .011 | 0.907 ± .002 |
| MI | 0.912 ± .001 | 0.892 ± .002 | — | 0.936 ± .001 | 0.938 ± .001 | 0.934 ± .000 |
| WI | 0.501 ± .012 | 0.798 ± .021 | — | 0.904 ± .009 | 0.881 ± .009 | 0.898 ± .006 |

To calculate the correlation errors, we first compute the correlation $r_{i,j}$ between each pair of fields i, j. To compute correlations involving categorical columns, we convert them to one hot vectors. We then compute the correlation between columns on the synthetic data $\hat{r}_{I,j}$ and the correlation error as the absolute difference between these values $|r_{i,j}-\hat{r}_{I,j}|$. These errors should approach zero as we expect the correlations between columns in the synthetic data to be the same as those in the real data. We can see TabMT's correlation errors are consistently distributed closer to zero than either TabDDPM or CTabGAN+. Erroneous and missing correlations will appear as non-zero values in the histograms of FIGS. 3*a*-3*l*.

Maintaining privacy of the original data is a key application for synthetic tabular data. Machine learning is seeing a growing application across a wide range of areas to produce valuable insights. At the same time, there is a rapid rise in both regulations and privacy concerns that need to be taken into account. As demonstrated above, the data produced by TabMT is high enough quality to produce strong classifiers. Next we evaluate the TabMT model for privacy. This evaluation complements our quality evaluation and verifies that our model is generating novel data.

Figure 4A:
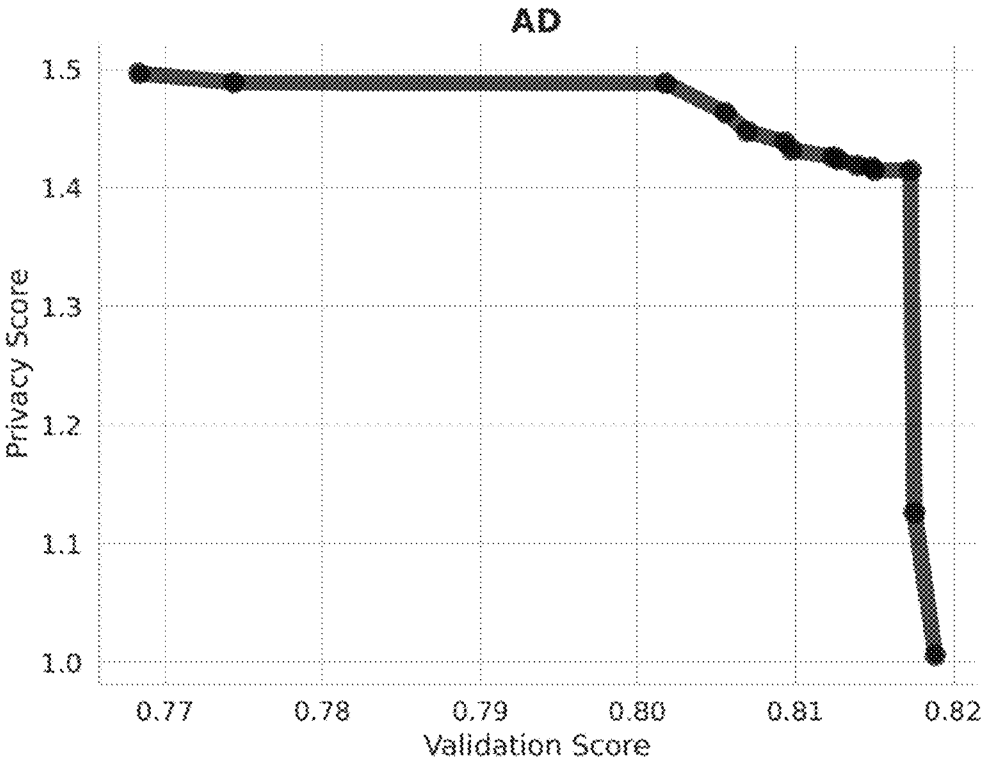
FIGS. 4*a*-4*f* show the pareto fronts of TabMT across several datasets including: AD (FIG. 4*a*); FB (FIG. 4*b*); CAR (FIG. 4*c*); MI (FIG. 4*d*); DI (FIG. 4*e*) and KI (FIG. 4*f*) in accordance with one or more embodiments herein.
Figure 4B:
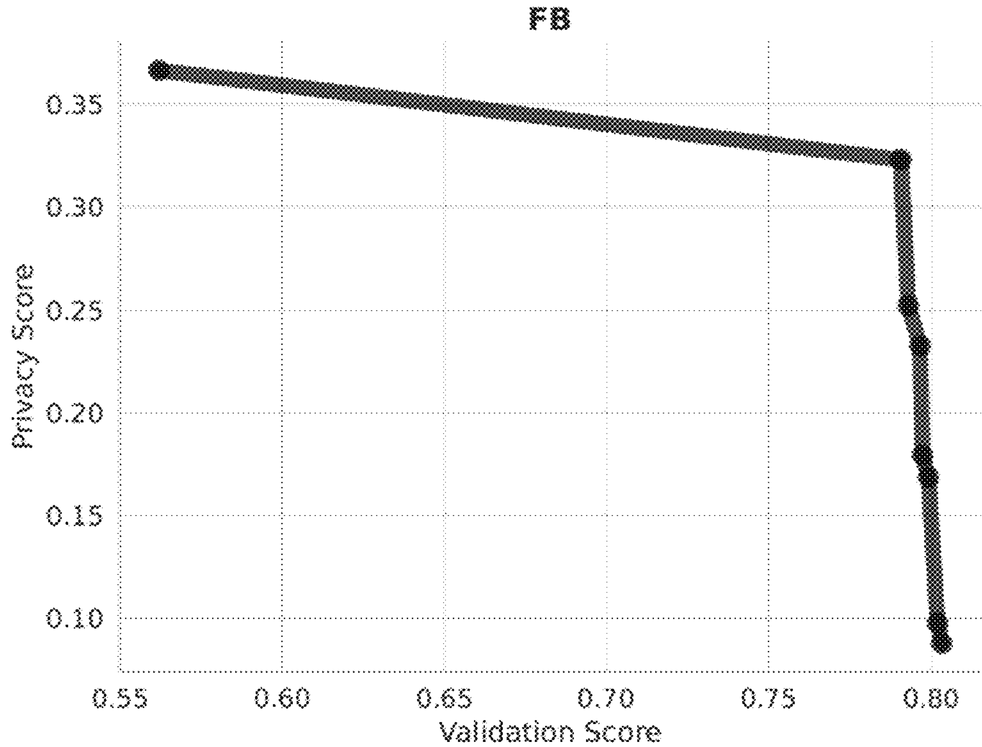
Figure 4C:
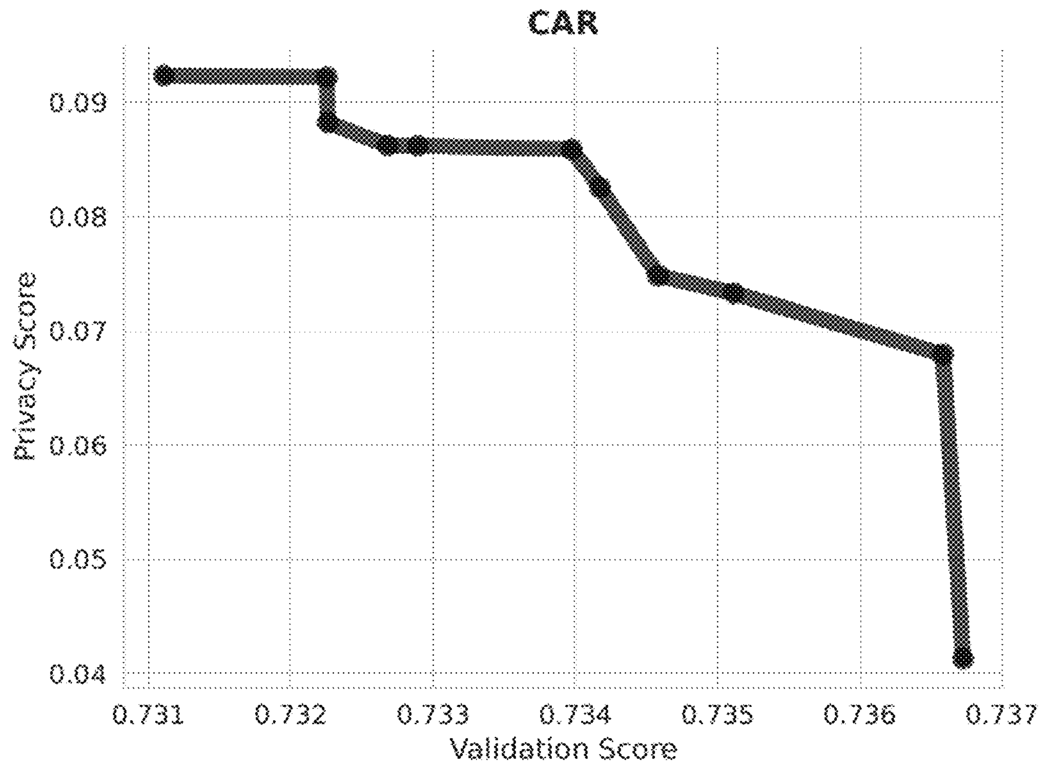
Figure 4D:
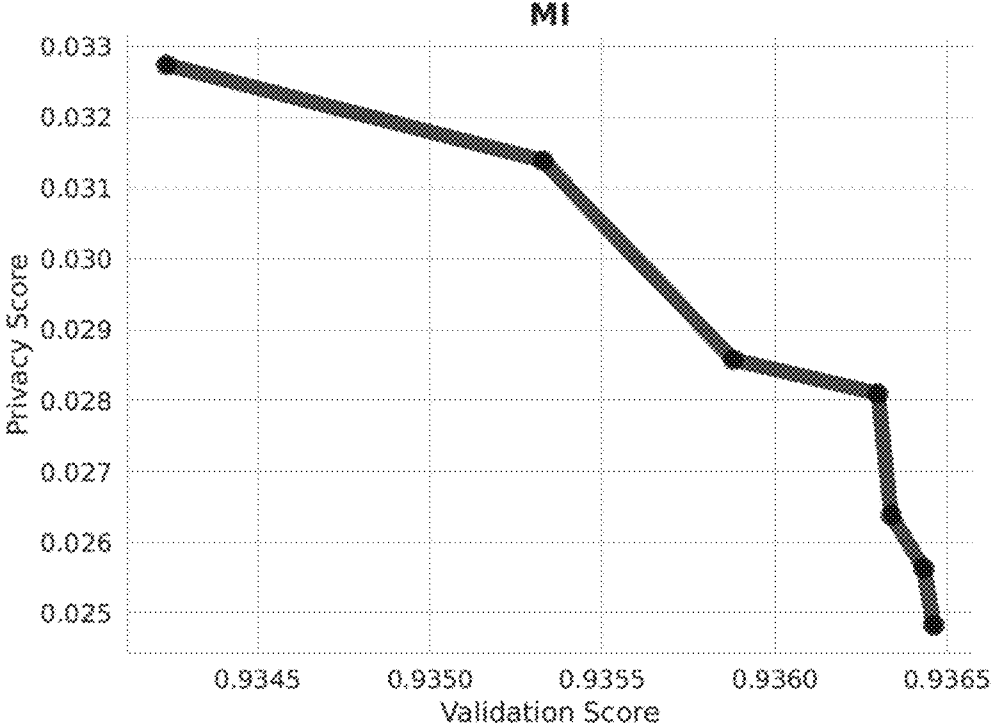
Figure 4E:
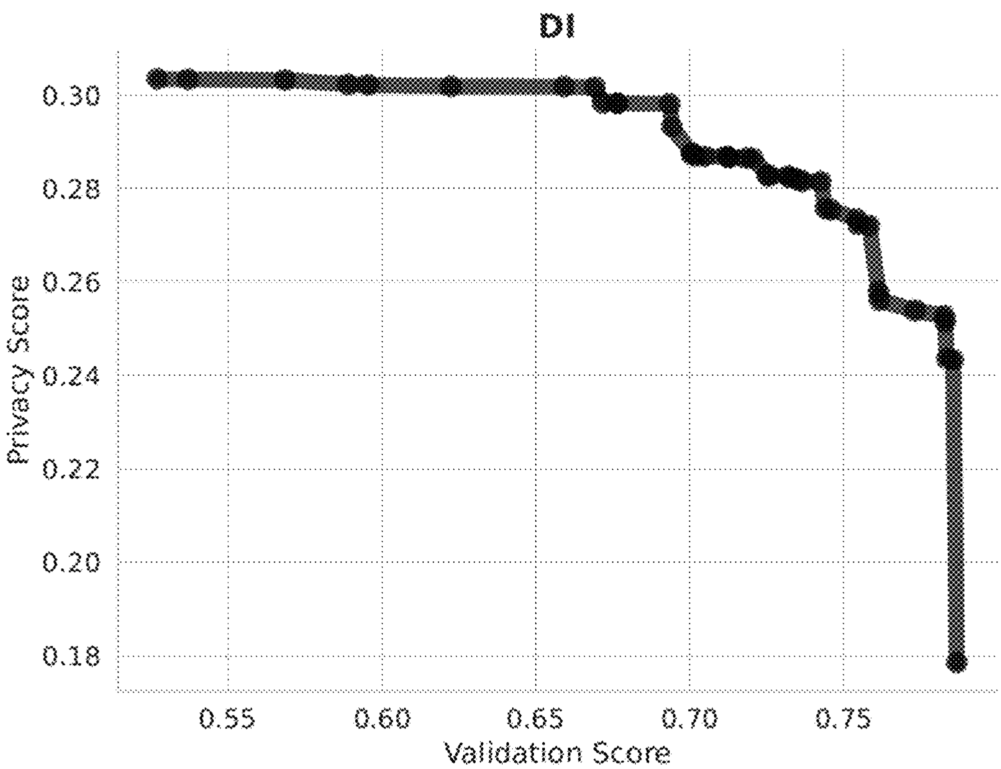
Figure 4F:
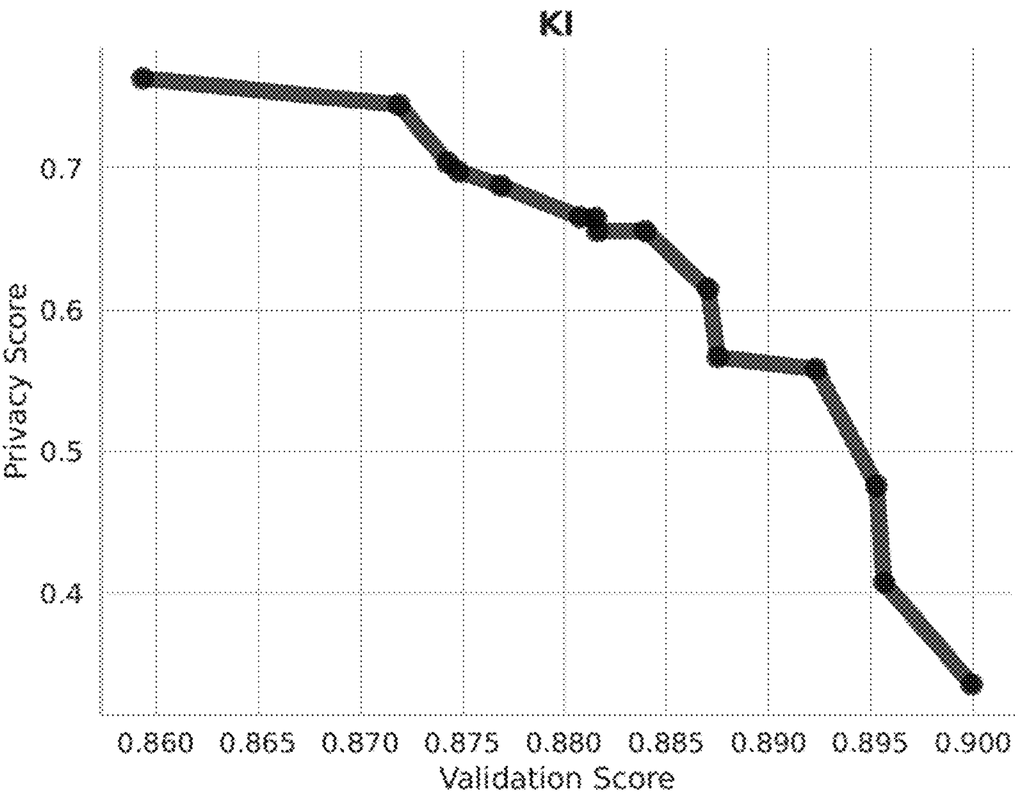

A high-quality, non-private model can trivially be formed by directly reproducing the training set. By ensuring the TabMT model is both private, and high quality, we verify that the TabMT model has learned the intrinsic structure of the data, and not simply memorized it. To evaluate privacy and novelty we adopt the median Distance to the Closest Record (DCR) score. To calculate the DCR of a synthetic sample, we find the closest datapoint in the real training set in terms of euclidean distance. We report the median of this value across our synthetic samples. There is an inherent tradeoff between privacy and quality. Higher quality samples will tend to be closer to points in the training set and vice versa. While models such as CTabGAN+ and TabDDPM have a fixed tradeoff between privacy and quality after training, TabMT can dynamically tradeoff between quality and privacy using temperature scaling. By walking along the pareto curve of the TabMT model using temperature scaling, we can controllably tune the privacy per application. By scaling a field's temperature higher, its values will become more diverse and private, but they will also be less faithful to the true correlations within the data. The tradeoff between the quality and privacy here form a pareto front for TabMT on each dataset. We use a separate temperature for each column and perform a small random search to find the pareto front. In Table 6, we compare TabMT's DCR and corresponding MLE scores to that of TabDDPM. We are always able to attain a higher DCR score, and in most cases a higher MLE score as well. FIGS. 4*a*-4*f* show the pareto fronts of TabMT across several datasets including: AD (FIG. 4*a*); FB (FIG. 4*b*); CAR (FIG. 4*c*); MI (FIG. 4*d*); DI (FIG. 4*e*) and KI (FIG. 4*f*).

TABLE 6

| DS | TabDDPM | TabMT |
|---|---|---|
| AB | 0.050(.550) | 0.249(.533) |
| AD | 0.104(.795) | 1.01(.811) |
| BU | 0.143(.906) | 0.165(.908) |
| CA | 0.041(.836) | 0.117(.832) |
| CAR | 0.012(.737) | 0.041(.737) |
| CH | 0.157(.755) | 0.281(.758) |
| DI | 0.204(.740) | 0.243(.740) |
| FB | 0.112(.713) | 0.252(.787) |
| GE | 0.059(.597) | 0.234(.599) |
| HI | 0.449(.722) | 0.483(.727) |
| HO | 0.086(.677) | 0.151(.607) |
| IN | 0.041(.809) | 0.061(.816) |
| KI | 0.189(.833) | 0.335(.868) |
| MI | 0.022(.936) | 0.026(.936) |
| WI | 0.016(.904) | 0.063(.881) |

Real world data is often full of missing values which can make training difficult. When a row has a missing value we must either drop the row, or find a method to impute it. Other techniques such as the RealTabformeror TabDDPM cannot natively handle real world missing data, and must either use a different imputation technique or drop the corresponding rows. The novel masking procedure described in the embodiments herein, allows TabMT to natively handle arbitrary missing data. To demonstrate this, we randomly drop 25% of values from the dataset, ensuring nearly every row is permanently missing data. Nevertheless, our model is still able to train, producing synthetic rows with no missing values in them. This facilitates training on real world data. Table 7 shows our accuracy when training with missing data for datasets AD and KI.

TABLE 7

| Dataset | MLE | Delta |
|---|---|---|
| AD | 0.813 | −0.001 |
| KI | 0.868 | −0.008 |

Additionally, the TabMT model can be arbitrarily conditioned to produce any subset of the data distribution at no additional cost, allowing us to more effectively augment underrepresented portions of data. The prior art techniques are largely incapable of conditioning when producing outputs.

The provisional patent application to which the present application claims the benefit of priority, described a particular use case for which the TabMT model for synthetic data generation is applicable and highly beneficial: network data. As discussed in the provisional application, having the capability to synthesize network data, such as metadata for network traffic flows, would be useful for troubleshooting, detecting security incidents, planning and billing.

Network data in computer networks is mostly encapsulated in network packets, which provide the load in the network. Network traffic is the main component for network traffic measurement, network traffic control and simulation. Network traffic flows can be measured to understand what hosts are talking on the network, with details of addresses, volumes and types of traffic. Data from this model can be used to train downstream models across a variety of tasks. We can finetune on specific network data, or condition on portions of our data, allowing us to augment data beyond what is available. This results in better downstream models than would otherwise be possible. Anomaly detection can be performed with this model directly, as it can be used to gauge the probability of new unseen traffic, allowing us to find the unusual traffic. We can also generate anomalous traffic for other models to train on directly, or baseline on the normal traffic which is generated. Further, our model's embeddings are highly informative and can be used directly by other models as well.

Flow metadata describes characteristics of packets in a flow. This information about data (metadata) is higher level than individual packets, so takes up less space, is easier to analyze and scales better. Flow metadata might include aggregated totals, e.g., total data and packets, as well as environmental data such as times and interfaces. Types of flow metadata include: (1) flow properties which are generally immutable and include characteristics such as IP protocol and addresses and treatment properties such as interfaces/ports and (2) flow features which are dynamic and can be measured across all packets in the flow. These flow features might include average/maximum/minimum/sum/difference of metrics such as packets, packet size, start time, end time etc.

An organization's network traffic is voluminous, which presents an initial barrier to measurement and monitoring. And a second barrier is data privacy, which restricts access to an organization's network data to protect the organization from, e.g., cybersecurity threats, as well as from theft of business confidential information. Without access to accurately represent network data flows, i.e., data which represents diverse real-world data sets, the ability to assess such data is necessarily limited. The TabMT model described herein can generate synthetic bi-directional flow data. TabMT is able to generate data according to specifications of attributes of the data as it is generated. TabMT is able to generate malicious or anomalous traffic based on new and evolving threats like APT-29.

Netflow data is a specific type of tabular data that captures network communication events and is commonly used for network traffic analysis, intrusion detection, and cybersecurity applications. Netflow datasets are typically extremely large, with complex rules between fields, and a high number of possible values per field. Generating realistic synthetic netflow data is crucial for developing and testing network monitoring tools and security algorithms. The TabMT model performs well when scaling to very large datasets, like Netflow datasets. Table 8 shows the structure of a typical netflow. The netflow data includes both categorical and continuous attributes and the range and number of unique values differ drastically between these attributes.

TABLE 8

| Field | Type | Value |
|---|---|---|
| Date | timestamp | 2022-05-01 00:00:00.123 |
| Source IP | categorical | 192.168.1.12 |
| Destination IP | categorical | 10.0.0.3 |
| Protocol | categorical | TCP |
| Source Port | categorical | 34179 |
| Destination Port | categorical | 443 |
| Duration | continuous | 0.12 |
| Bytes | ordinal | 1228 |
| Packets | ordinal | 18 |
| Flags | categorical | .A..S. |
| Type of Service | categorical | 32 |

We use the CIDDS-001 dataset as our benchmark dataset. These results, together with those discussed above, demonstrate that TabMT is both sample-efficient enough to learn with just a few hundred samples, while remaining general enough to scale to over thirty million samples.

For this example, the Netflow data is pre-processed to be categorical instead of ordinal or continuous. The date field is split in several fields representing portions of the timestamp namely Day of the week, Hour, Minute, Second, And millisecond. In this work, we assume the traffic distribution to be stationary across weeks, and therefore only keep track of the day of the week. We quantize the Bytes, Duration, and Packet fields. However for this dataset, we are able to do this in a lossless manner. Despite these fields being unbonded, only a finite number of values are actually encountered within the dataset, we therefore quantize according encountered values. For example, in the Bytes field across the 33 million flows of the dataset, only roughly 180,000 unique values are encountered in the dataset. We thus convert this ordinal field to a categorical one of cardinality 180,000. The model then outputs an index across these values when generating data, rather than output the value directly. The structure of the post-processed netflow can be seen in Table 9.

TABLE 9

| Field | Cardinality |
|---|---|
| Weekday | 7 |
| Hour | 24 |
| Minute | 60 |
| Second | 60 |
| Millisecond | 1000 |
| Source IP | 51092 |
| Destination IP | 50923 |
| Protocol | 5 |
| Source Port | 61700 |
| Destination Port | 61448 |
| Duration | 37787 |
| Bytes | 181536 |
| Packets | 10489 |
| Flags | 34 |
| Type of Service | 5 |

We trained three model sizes on the CIDDS-001 dataset and computed metrics on the resulting samples. The model topologies are outlined in Table 10. Because ML Efficiency and DCR are very costly to compute on a dataset of this scale, we instead adapt Precision and Recall to tabular domain. Precision represents the portion of data which would likely be generated from our reference distribution. Recall is the opposite, as in what percentage of data we expect to be generated by our model.

TABLE 10

| Model | Width | Depth | Heads |
|---|---|---|---|
| TabMT-S | 64 | 12 | 4 |
| TabMT-M | 384 | 12 | 8 |
| TabMT-L | 576 | 24 | 12 |

The original definitions of these metrics rely on vision models to produce the embeddings used. We found that the TabMT masking procedure produces strong embeddings for each sample, and opted to use embeddings produced by our smallest model, TabMT-S, concatenating them to make an embedding for each flow. Specifically, we averaged the embeddings across the fields to produce embeddings of dim 64 for each flow. We used a fixed neighborhood size of k=3. We included an additional diversity metric defined as the average set coverages across all properties of the generated data. Diversity computes, for each field, the number of unique values, produced by our model, as a fraction of unique values present in the reference set of data for that field. To compute reference values and values for our models we split our validation set in half, and treat one half as the reference set, treating the other half as the baseline set to establish ceilings for our metrics. Performance results in Table 11 demonstrate strong scaling and performance across three model sizes. We can see Precision and Recall are both very close to that of the validation set. Sample diversity and quality both scale as model size increases.

TABLE 11

| Source | Validation Set | NFGAN | TabMT-S | TabMT-M | TabMT-L |
|---|---|---|---|---|---|
| Precision | 90.42 | 77.64 | 82.58 | 85.77 | 88.10 |
| Recall | 90.58 | 63.32 | 91.88 | 91.82 | 91.12 |
| Diversity | 100.0 | 46.97 | 89.81 | 90.56 | 99.43 |

We compare these against the prior state-of-the-art NetflowGAN (NFGAN) described in Markus Ring et al., Flow-based network traffic generation using generative adversarial networks, Computers & Security, 82:156-172, 2019 (hereafter "Ring"), which is incorporated herein by reference. NFGAN was tuned specifically for the CIDDS-001 dataset. As described in Ring, it is trained in two phases. First IP2Vec is trained to produce Netflow embeddings. These embeddings are then used as targets for the generator during GAN training. Results from NFGAN are shown in Table 11. We can see that NFGAN obtains reasonably high precision, but poor recall and diversity. This is because the model suffers from mode collapse, producing samples in only a small portion of the full distribution.

Figure 5A:
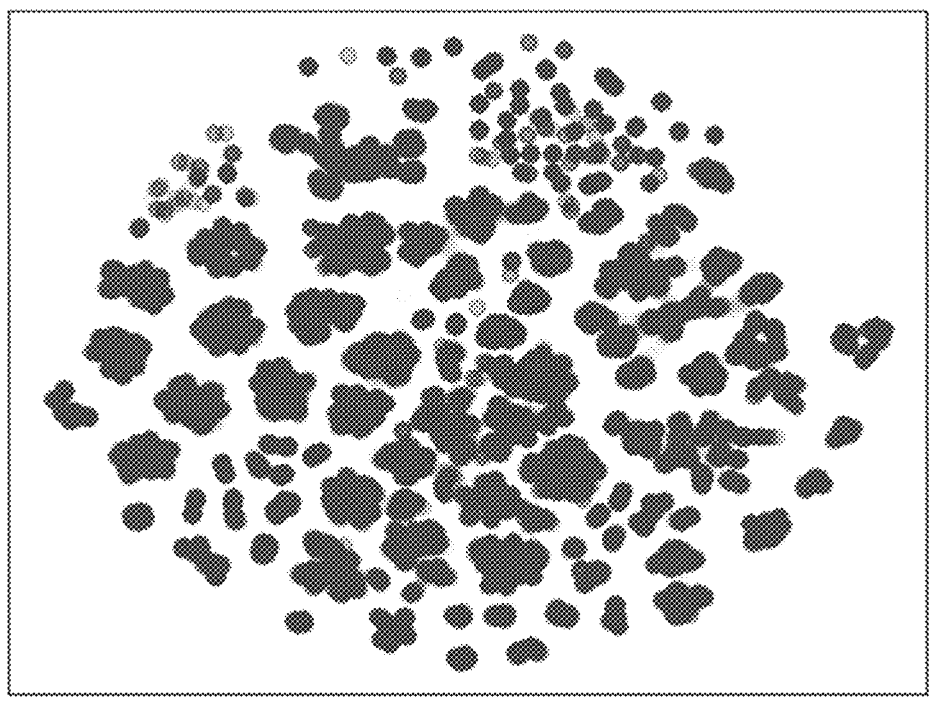
FIGS. 5*a* and 5*b* show a comparison between the fake (FIG. 5*a*) and real (FIG. 5*b*) manifolds of data in the Netflow domain in accordance with an embodiment herein.
Figure 5B:
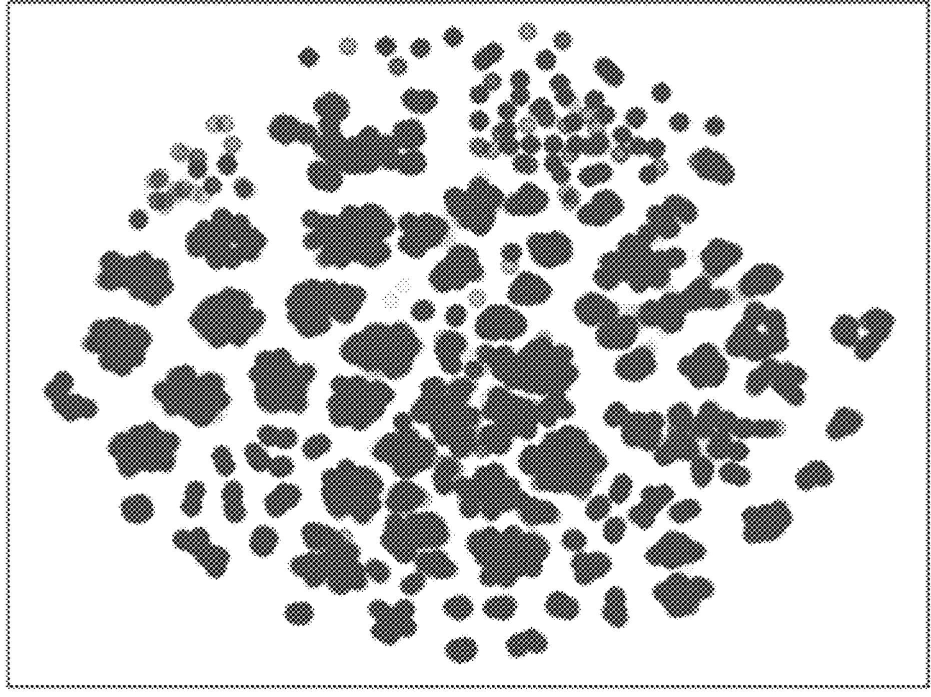

FIGS. 5*a* and 5*b* show a comparison between the fake (FIG. 5*a*) and real (FIG. 5*b*) manifolds of data. We use PaCMAP (Pairwise Controlled Manifold Approximation) for embedding and visualizing the data, and embed half the validation set, and a equivalently sized sample of data generated by our largest model for this visualization. We can see the manifolds are extremely similar and show good capture of the data distribution. The manifolds are projected from the embeddings generated by our smallest model.

Figure 6A:
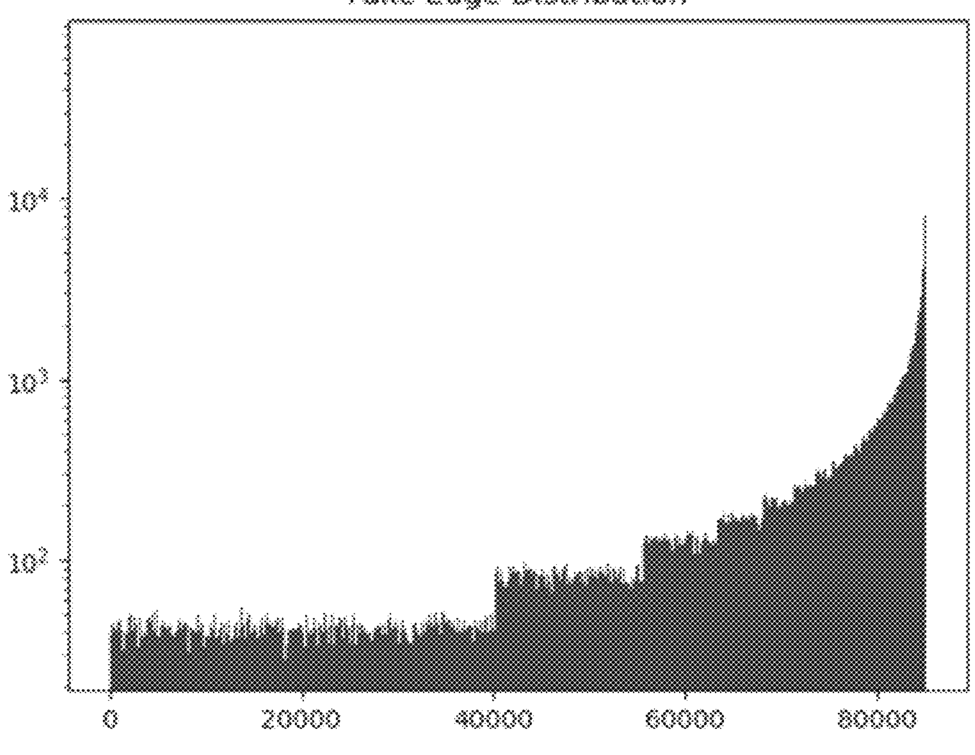
FIGS. 6*a* and 6*b* show histograms across connections represented in the fake data (FIG. 6*a*) and the real data (FIG. 6*b*) in the Netflow domain in accordance with an embodiment herein.
Figure 6B:
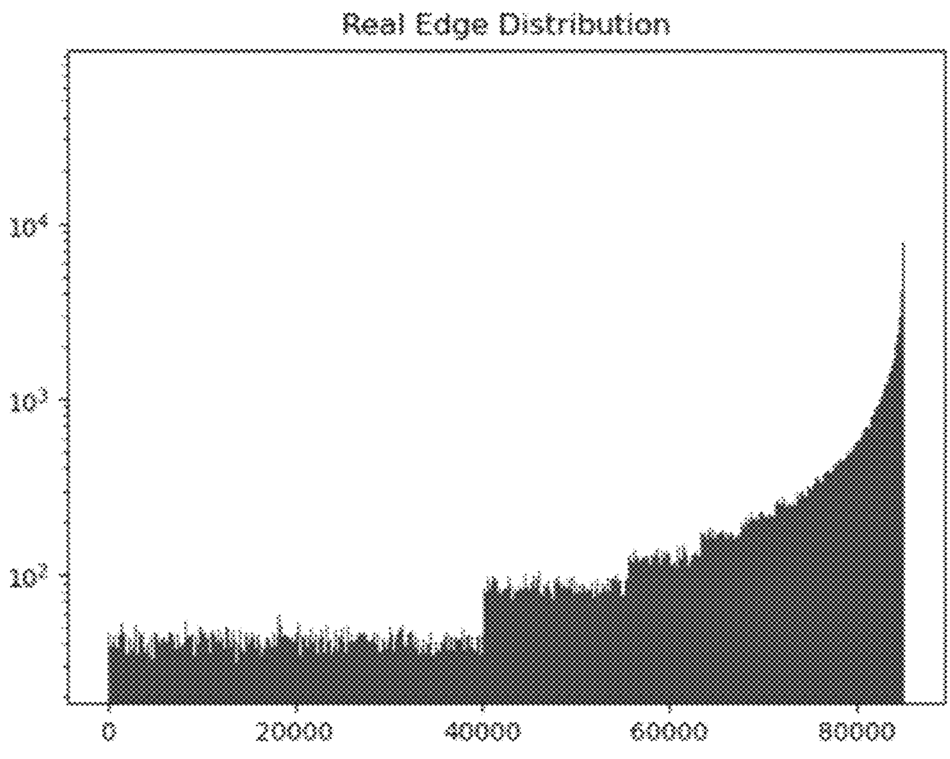

FIGS. 6*a* and 6*b* are histograms across connections represented in the data. Specifically we plot the frequency of netflows between pairs of hosts on our network. We can again see a similar distribution of connections in the fake data (FIG. 6*a*) and the real data (FIG. 6*b*).

Netflow has both correlations between the fields and complex invariants between fields. We can measure the violation rate of these invariants to understand how well our model is detecting patterns within the data. We measured against seven invariants proposed in Ring. Because we construct embeddings per field, our model cannot violate check 5 (*). These tests check structural rules reflected in Netflow, such as the fact that two public ip addresses cannot talk to each other.

As shown in Table 12, TabMT produces substantially more diverse data, while achieving a median 20× improvement in violation probability over NFGAN.

TABLE 12

| Invariants | NFGAN | TabMT-S | TabMT-M | TabMT-L |
|---|---|---|---|---|
| TCP Flags | 2.3e-03 | 4.63e-04 | 2.16e-04 | 6.54e-06 |
| Private IPs | 2.00e-04 | 7.25e-05 | 2.67e-05 | 1.14e-05 |
| TCP Port | 3.00e-04 | 9.32e-05 | 3.94e-05 | 1.47e-05 |
| DNS | 1.60e-03 | 2.34e-03 | 1.56e-03 | 2.05e-04 |
| Valid Values* | 2.00e-03 | 0.00e+00 | 0.00e+00 | 0.00e+00 |
| NetBios | 7.43e-01 | 4.73e-03 | 4.64e-03 | 1.27e-03 |
| Packet Ratios | 5.10e-03 | 2.28e-03 | 1.79e-03 | 1.16e-03 |

Accordingly, described herein is a novel architecture, Masked Transformer architecture, TabMT, for generating high quality synthetic tabular data. As discussed above with respect to the comprehensive series of benchmarks, it is shown that TabMT produces higher quality data than prior state-of-the-art tabular generators including GANs, VAEs, Autoregressive Transformers, and Diffusion models. Further, TabMT is able to do this while functioning under a broader set of conditions such as missing data, and is able to function under arbitrary privacy budgets; having the ability to arbitrarily trade-off privacy and quality through temperature scaling. TabMT is also scalable from very small to very large tabular databases. TabMT's masking procedure enables it to effectively handle missing data, thereby increasing privacy and model applicability in real-world use cases.

In accordance with these superior features, TabMT has broad applicability across all industries which rely on tabular data, including, but not limited to the fields of finance for fraud detection and economical prediction, healthcare and insurance for clients and events studies, social media for user behavior, streaming services for behavior and set of recommendations, marketing and advertising campaigns for customers behavior and reactions. Tabular data is one of the most common and important data modalities. Enormous amounts of data, such as clinical trial records, financial data, census results, are all represented in tabular format. The ability to use synthetic datasets, i.e., where sensitive attributes and Personally Identifiable Information (PII) are not disclosed, is crucial for staying compliant with privacy regulations, while still providing data for analysis, sharing, and experimenting. By way of example, given patient privacy concerns in the healthcare industry, TabMT is able to generate synthetic data, e.g., synthetic patient medical records data, synthetic genomic datasets, for use in research projects. Further, synthetic tabular data can provide data diversity and generate data for rare cases which represent realistic possibilities, but for which data is difficult to source from authentic data.

The invention claimed is:

1. A process for training a transformer-based generator model to generate synthetic data comprising:

embedding, by at least one embedding model, input data, wherein the input data includes multiple fields $F_{i,j}$ containing real data values and the at least one embedding model constructs l embedding matrices, one for each of the multiple fields $F_{i,j}$;

producing, by a masking model, a set of masked fields $$F_i^m$$

for each row $F_i$ of data in an embedded input dataset and replacing the real data value of each field in the masked set $$F_i^m$$

with a mask token, wherein a training distribution $$|F_i^m|$$

of the masked fields $$F_i^m$$

in each row $F_i$ of data is uniform; and predicting, by a transformer model, the real data value for each mask token in each of the masked fields $$F_i^m$$

over multiple iterations.

2. The process of claim 1, wherein the masking model masks a random number of fields $F_{i,j}$.

3. The process of claim 2, wherein the masking model masks fields $F_{i,j}$ with probability $p \sim U(0, 1)$, sampling p for each row $F_i$.

4. The process of claim 1, further comprising:

embedding, by a first embedding model, categorical data within the input data; and embedding, by a second embedding model, numerical data within the input data, wherein embedding numerical data includes a quantizing the numerical data and generating ordered embeddings.

5. The process of claim 4, further comprising outputting data from the transformer model to a dynamic linear layer.

6. The process of claim 5, further comprising pairing the dynamic linear layer is paired the ordered embeddings.

7. The process of claim 1, wherein the input data is tabular data.

8. The process of 1, wherein the transformer model is a neural network.

9. A process for training a transformer-based generator model to generate synthetic data comprising:

embedding, by at least one embedding model, input data, wherein the input data includes multiple fields containing real data values and the at least one embedding model constructs an embedding matrix for each of the multiple fields;

producing, by a masking model, a set of masked fields for each row of data in an embedded input dataset and replacing the real data value of each field in the masked set with a mask token, wherein a training distribution of the masked fields in each row of data is uniform; and predicting, by a transformer model, the real data value for each mask token in each of the masked fields over multiple iterations.

10. The process of claim 9, wherein the masking model masks a random number of the multiple fields.

11. The process of claim 10, wherein the masking model masks random fields a predetermined probability p, sampling p for each row.

12. The process of claim 9, further comprising:

embedding, by a first embedding model, categorical data within the input data; and embedding, by a second embedding model, numerical data within the input data, wherein embedding numerical data includes a quantizing the numerical data and generating ordered embeddings.

13. The process of claim 12, further comprising outputting data from the transformer model to a dynamic linear layer.

14. The process of claim 13, further comprising pairing the dynamic linear layer is paired the ordered embeddings.

15. The process of claim 9, wherein the input data is tabular data.

16. The process of 9, wherein the transformer model is a neural network.

* * * * *